US012700349B2

(12) United States Patent
Kim et al.

(10) Patent No.: US 12,700,349 B2
(45) Date of Patent: Aug. 4, 2026

(54) PIXEL CIRCUIT, DISPLAY APPARATUS HAVING THE SAME, AND AN ELECTRONIC DEVICE INCLUDING THE DISPLAY DEVICE

(71) Applicant: Samsung Display Co., LTD., Yongin-si (KR)

(72) Inventors: Kwihyun Kim, Yongin-si (KR); Sehyun Lee, Yongin-si (KR); Haksun Chang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/026,024

(22) Filed: Jan. 16, 2025

(65) Prior Publication Data

US 2025/0342794 A1 Nov. 6, 2025

(30) Foreign Application Priority Data

May 2, 2024 (KR) ........................ 10-2024-0058338

(51) Int. Cl.
*G09G 3/32* (2016.01)
*G09G 3/3225* (2016.01)
(Continued)

(52) U.S. Cl.
CPC ............. *G09G 3/32* (2013.01); *G09G 3/3225* (2013.01); *G09G 3/3233* (2013.01);
(Continued)

(58) Field of Classification Search
CPC ......... G09G 3/3233; G09G 2300/0819; G09G 2310/08; G09G 2330/021;
(Continued)

(56) References Cited

U.S. PATENT DOCUMENTS

2019/0237019 A1* 8/2019 Gao ..................... G09G 3/3233
2021/0210002 A1* 7/2021 Kim ......................... G09G 3/32
(Continued)

FOREIGN PATENT DOCUMENTS

KR 10-2022-0052265 A 4/2022

OTHER PUBLICATIONS

Richter, et al. OLED-on-CMOS based bidirectional microdisplay for near-to-eye and sensor applications; Center for Organic Materials and Electronic Devices Dresden Fraunhofer IPMS, Dresden, Germany; 3 pages; Downloaded on Dec. 5, 2024 at 11:00:26 UTC from IEEE Xplore.

*Primary Examiner* — Dismery Mercedes
(74) *Attorney, Agent, or Firm* — Womble Bond Dickinson (US) LLP

(57) ABSTRACT

A pixel circuit includes: a first transistor including a control electrode connected to a first node, a first electrode connected to a second node, and a second electrode connected to a third node; a second transistor configured apply a data voltage to the first transistor; a third transistor connected to the first node and the third node; a fourth transistor configured to apply a first power voltage to the second node in response to a first emission signal; a fifth transistor configured to apply a voltage of a fourth node to the third node in response to a second emission signal different from the first emission signal; a seventh transistor configured to apply a driving current to a light emitting element and connected to the fourth node; a ninth transistor configured to apply an initialization voltage to the fourth node.

21 Claims, 15 Drawing Sheets

(51) Int. Cl.
*G09G 3/3233* (2016.01)
*G09G 3/3241* (2016.01)
*G09G 3/3258* (2016.01)

(52) U.S. Cl.
CPC ......... *G09G 3/3241* (2013.01); *G09G 3/3258* (2013.01); *G09G 2300/0819* (2013.01); *G09G 2310/08* (2013.01); *G09G 2320/0238* (2013.01); *G09G 2330/021* (2013.01)

(58) Field of Classification Search
CPC ... G09G 2320/0233; G09G 2300/0426; G09G 3/32; G09G 3/3258; G09G 2320/0238; G09G 2300/0866; G09G 3/3241
See application file for complete search history.

(56) References Cited

U.S. PATENT DOCUMENTS

| | | | | |
|---|---|---|---|---|
| 2021/0280130 A1* | 9/2021 | Wang | G09G 3/3233 |
| 2022/0101783 A1* | 3/2022 | Han | G09G 3/32 |
| 2022/0114951 A1* | 4/2022 | Chang | G09G 3/32 |
| 2022/0406257 A1* | 12/2022 | Gu | G09G 3/3241 |
| 2023/0078842 A1* | 3/2023 | Kim | G09G 3/32<br>257/443 |
| 2024/0062721 A1* | 2/2024 | Liu | G09G 3/3233 |
| 2024/0203338 A1* | 6/2024 | Huang | G09G 3/2007 |
| 2025/0037659 A1* | 1/2025 | Xu | G09G 3/3233 |
| 2025/0252896 A1* | 8/2025 | Zhou | G09G 3/3233 |

* cited by examiner

PIXEL CIRCUIT, DISPLAY APPARATUS HAVING THE SAME, AND AN ELECTRONIC DEVICE INCLUDING THE DISPLAY DEVICE

CROSS-REFERENCE TO RELATED APPLICATION

The present application claims priority to and the benefit of Korean Patent Application No. 10-2024-0058338, filed on May 2, 2024, in the Korean Intellectual Property Office, the entire disclosure of which is incorporated by reference herein.

BACKGROUND

1. Field

The present disclosure relates to a pixel circuit, a display apparatus including the same, and an electronic device including the display device.

2. Description of the Related Art

Generally, a display apparatus includes a display panel and a display panel driver. The display panel includes a plurality of gate lines, a plurality of data lines, and a plurality of pixels. The display panel driver includes a gate driver providing a gate signal to the gate lines, a data driver providing a data voltage to the data lines, and a driving controller controlling the gate driver, and the data driver.

A conventional pixel circuit driven by pulse width modulation method and performing internal compensation of a threshold voltage may include nineteen or more transistors and three or more capacitors, so that it is difficult to apply it to an ultra-high-resolution display apparatus due to limitations in integration.

SUMMARY

Embodiments of the present disclosure provide a pixel circuit that is driven by pulse width modulation, performs internal compensation of threshold voltage, and includes a small number of transistors, applicable to ultra-high resolution display apparatus.

Embodiments of the present disclosure also provide a display apparatus including the pixel circuit, and an electronic device including the display device.

According to one or more embodiments, a pixel circuit may include a first transistor including a control electrode connected to a first node, a first electrode connected to a second node and a second electrode connected to a third node, a second transistor configured apply a data voltage to the first transistor, a third transistor connected to the first node and the third node, a fourth transistor configured to apply a first power voltage to the second node in response to a first emission signal, a fifth transistor configured to apply a voltage of a fourth node to the third node in response to a second emission signal different from the first emission signal, a seventh transistor configured to apply a driving current to a light emitting element and connected to the fourth node, a ninth transistor configured to apply an initialization voltage to the fourth node and the light emitting element is configured to emit light based on the driving current. The initialization voltage may have a low initialization voltage level or a constant current voltage level. The first transistor may be a P-type transistor, the second transistor may be an N-type transistor, the third transistor may be an N-type transistor and the seventh transistor may be a P-type transistor.

In one or more embodiments, the ninth transistor may include a control electrode configured to receive a second scan signal, a first electrode configured to receive the initialization voltage and a second electrode connected to the fourth node.

In one or more embodiments, the pixel circuit may further include a first capacitor including a first electrode configured to receive a sweep signal and a second electrode connected to the first node.

In one or more embodiments, the pixel circuit may further include an eighth transistor including a control electrode configured to receive an initialization signal, a first electrode configured to receive a light emitting element initialization voltage and a second electrode connected to the light emitting element.

In one or more embodiments, may further include a sixth transistor including a control electrode the first emission signal, a first electrode configured to receive a second power voltage and a second electrode connected to the seventh transistor.

In one or more embodiments, the pixel circuit may further include a second capacitor including a first electrode receiving a second power voltage and a second electrode connected to the fourth node.

In one or more embodiments, the second transistor may include a control electrode configured to receive a first scan signal, a first electrode configured to receive the data voltage and a second electrode connected to the second node. The third transistor may include a control electrode configured to receive the first scan signal, a first electrode connected to the first node and a second electrode connected to the third node. The seventh transistor may include a control electrode connected to the fourth node, a first electrode connected to a fifth node and a second electrode connected to the light emitting element.

In one or more embodiments, the pixel circuit may further include a first capacitor, a second capacitor, a sixth transistor and an eighth transistor. The second transistor may include a control electrode configured to receive a first scan signal, a first electrode configured to receive the data voltage and a second electrode connected to the second node. The third transistor may include a control electrode configured to receive the first scan signal, a first electrode connected to the first node and a second electrode connected to the third node. The fourth transistor may include a control electrode configured to receive the first emission signal, a first electrode configured to receive the first power voltage and a second electrode connected to the second node. The fifth transistor may include a control electrode configured to receive the second emission signal, a first electrode connected to the third node and a second electrode connected to the fourth node. The sixth transistor may include a control electrode configured to receive the first emission signal, a first electrode connected to a fifth node and a second electrode connected to a sixth node. The seventh transistor may include a control electrode connected to the fourth node, a first electrode configured to receive a second power voltage and a second electrode connected to the fifth node. The eighth transistor may include a control electrode configured to receive an initialization signal, a first electrode configured to receive a light emitting element initialization voltage and a second electrode connected to the sixth node. The ninth transistor may include a control electrode configured to receive a second scan signal, a first electrode configured to receive the initialization voltage and a second electrode connected to the fourth node. The first capacitor may include a first electrode configured to receive a sweep signal and a second electrode connected to the first node. The second capacitor may include a first electrode configured to receive the second power voltage and a second electrode connected to the fourth node. The light emitting element may include a first electrode connected to the sixth node and a second electrode configured to receive a third power voltage.

In one or more embodiments, the pixel circuit may further include a first capacitor, a second capacitor, a sixth transistor and an eighth transistor. The second transistor may include a control electrode configured to receive a first scan signal, a first electrode configured to receive the data voltage and a second electrode connected to the second node. The third transistor may include a control electrode configured to receive the first scan signal, a first electrode connected to the first node and a second electrode connected to the third node. The fourth transistor may include a control electrode configured to receive the first emission signal, a first electrode configured to receive the first power voltage and a second electrode connected to the second node. The fifth transistor may include a control electrode configured to receive the second emission signal, a first electrode connected to the third node and a second electrode connected to the fourth node. The sixth transistor may include a control electrode configured to receive the first emission signal, a first electrode configured to receive a second power voltage and a second electrode connected to a fifth node. The seventh transistor may include a control electrode connected to the fourth node, a first electrode connected to the fifth node and a second electrode connected to a sixth node. The eighth transistor may include a control electrode configured to receive an initialization signal, a first electrode configured to receive a light emitting element initialization voltage and a second electrode connected to the sixth node. The ninth transistor may include a control electrode configured to receive a second scan signal, a first electrode configured to receive the initialization voltage and a second electrode connected to the fourth node. The first capacitor may include a first electrode configured to receive a sweep signal and a second electrode connected to the first node. The second capacitor may include a first electrode configured to receive the second power voltage and a second electrode connected to the fourth node. The light emitting element may include a first electrode connected to the sixth node and a second electrode configured to receive a third power voltage.

In one or more embodiments, the fourth transistor, the fifth transistor, the sixth transistor and the eighth transistor may be P-type transistors, and the ninth transistor may be an N-type transistor.

In one or more embodiments, the sixth transistor and the eighth transistor may be P-type transistors, and the fourth transistor, the fifth transistor and the ninth transistor may be N-type transistors.

In one or more embodiments, the light emitting element initialization voltage may be the third power voltage.

In one or more embodiments, in a first period, the initialization voltage may have the low initialization voltage level, the first scan signal may have an activation level, the second scan signal may have an activation level, the first emission signal may have an inactivation level, the second emission signal may have an activation level, and the initialization signal may have an activation level. In the first period, the third transistor, the fifth transistor, the eighth transistor and the ninth transistor may be turned on, and the fourth transistor may be turned off.

In one or more embodiments, in a second period following to the first period, the initialization voltage may have the low initialization voltage level, the first scan signal may have an inactivation level, the second scan signal may have an activation level, the first emission signal may have an inactivation level, and the second emission signal may have an inactivation level. In the second period, the ninth transistor may be turned on, and the fifth transistor may be turned off.

In one or more embodiments, in a third period following to the second period, the first scan signal may have an activation level, and the second emission signal may have an inactivation level. In the third period, the second transistor and the third transistor may be turned on, and the fifth transistor may be turned off.

In one or more embodiments, a fourth period following to the third period, the initialization voltage may have the constant current voltage level, the second scan signal may have an activation level, and the second emission signal may have an inactivation level. In the fourth period, the ninth transistor may be turned on, and the fifth transistor may be turned off.

In one or more embodiments, a fifth period following to the fourth period, the sweep signal may be gradually decreased from a high level, and the first emission signal may have an activation level. In the fifth period, the sixth transistor and the seventh transistor may be turned on.

In one or more embodiments, in a sixth period following to the fifth period, the sweep signal may be gradually decreased, and the second emission signal may have an activation level. In the sixth period, the first transistor and the fifth transistor may be turned on, and the seventh transistor may be turned off.

In one or more embodiments, in a seventh period following to the sixth period, the sweep signal may have the high level, the first emission signal may have an inactivation level, the second emission signal may have an inactivation level, and the initialization signal may have an activation level. In the seventh period, the eighth transistor may be turned on.

According to one or more embodiments, a display apparatus may include a display panel include a pixel circuit, a gate driver configured to apply a gate signal to the pixel circuit, an emission driver configured to apply an emission signal to the pixel circuit and a data driver configured to apply a data voltage to the pixel circuit. The pixel circuit may include a first transistor including a control electrode connected to a first node, a first electrode connected to a second node and a second electrode connected to a third node, a second transistor configured apply the data voltage to the first transistor, a third transistor connected to the first node and the third node, a fourth transistor configured to apply a first power voltage to the second node in response to a first emission signal, a fifth transistor configured to apply a voltage of a fourth node to the third node in response to a second emission signal different from the first emission signal, a seventh transistor configured to apply a driving current to a light emitting element and connected to the fourth node, a ninth transistor configured to apply an initialization voltage to the fourth node and the light emitting element configured to emit light based on the driving current. The initialization voltage may have a low initialization voltage level or a constant current voltage level. The first transistor may be a P-type transistor, the second transistor may be an N-type transistor, the third transistor may be an N-type transistor and the seventh transistor may be a P-type transistor.

In one or more embodiments, an electronic device includes a display device, the display device including: a display panel including a pixel circuit; and a display driver configured to drive the display panel, wherein the pixel circuit includes: a first transistor including a control electrode connected to a first node, a first electrode connected to a second node, and a second electrode connected to a third node; a second transistor configured apply a data voltage to the first transistor; a third transistor connected to the first node and the third node; a fourth transistor configured to apply a first power voltage to the second node in response to a first emission signal; a fifth transistor configured to apply a voltage of a fourth node to the third node in response to a second emission signal different from the first emission signal; a seventh transistor configured to apply a driving current to a light emitting element and connected to the fourth node; a ninth transistor configured to apply an initialization voltage to the fourth node; and wherein the light emitting element is configured to emit light based on the driving current, wherein the initialization voltage has a low initialization voltage level or a constant current voltage level, and wherein the first transistor is a P-type transistor, the second transistor is an N-type transistor, the third transistor is an N-type transistor, and the seventh transistor is a P-type transistor.

In one or more embodiments, the electronic device may include a cellular phone, a video phone, a smart pad, a television (TV), a smart watch, a car navigation system, a computer monitor, a laptop, or a head mounted display (HMD) device.

As described above, the pixel circuit may include nine transistors and two capacitors. The pixel circuit may be driven by pulse width modulation, perform an internal compensation of threshold voltage, and include a small number of transistors compared with conventional pixel circuit, so that the pixel circuit may have a high integration. Accordingly, the pixel circuit may be applied to an ultra-high resolution display apparatus. Additionally, at least one transistor of the pulse width modulation circuit and at least one transistor of the constant current generating circuit may be N-type transistors, so that a power consumption may be reduced. Additionally, the first transistor of the pulse width modulation circuit and the seventh transistor of the constant current generating circuit may be P-type transistors, so that mobility may be improved. Additionally, the light emitting element initialization voltage applied to the second electrode of the eighth transistor may be lower than the third power voltage applied to a cathode of the light emitting element, so that black characteristic of the pixel circuit may be improved. Additionally, the low initialization voltage level applied to the control electrode of the first transistor and the constant current voltage level applied to the control electrode of the seventh transistor may be outputted from a same voltage terminal, so that the number of the transistors and the number of the signal lines may be reduced. Additionally, through the second emission signal and the fifth transistor, the ninth transistor may apply the low initialization voltage level to the first node. Accordingly, the ninth transistor may be a transistor for initializing the first node and a transistor for applying the constant current voltage level to the fourth node. Accordingly, an integration of the pixel circuit may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, the present disclosure will be explained in detail with reference to the accompanying drawings.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Figure 1:
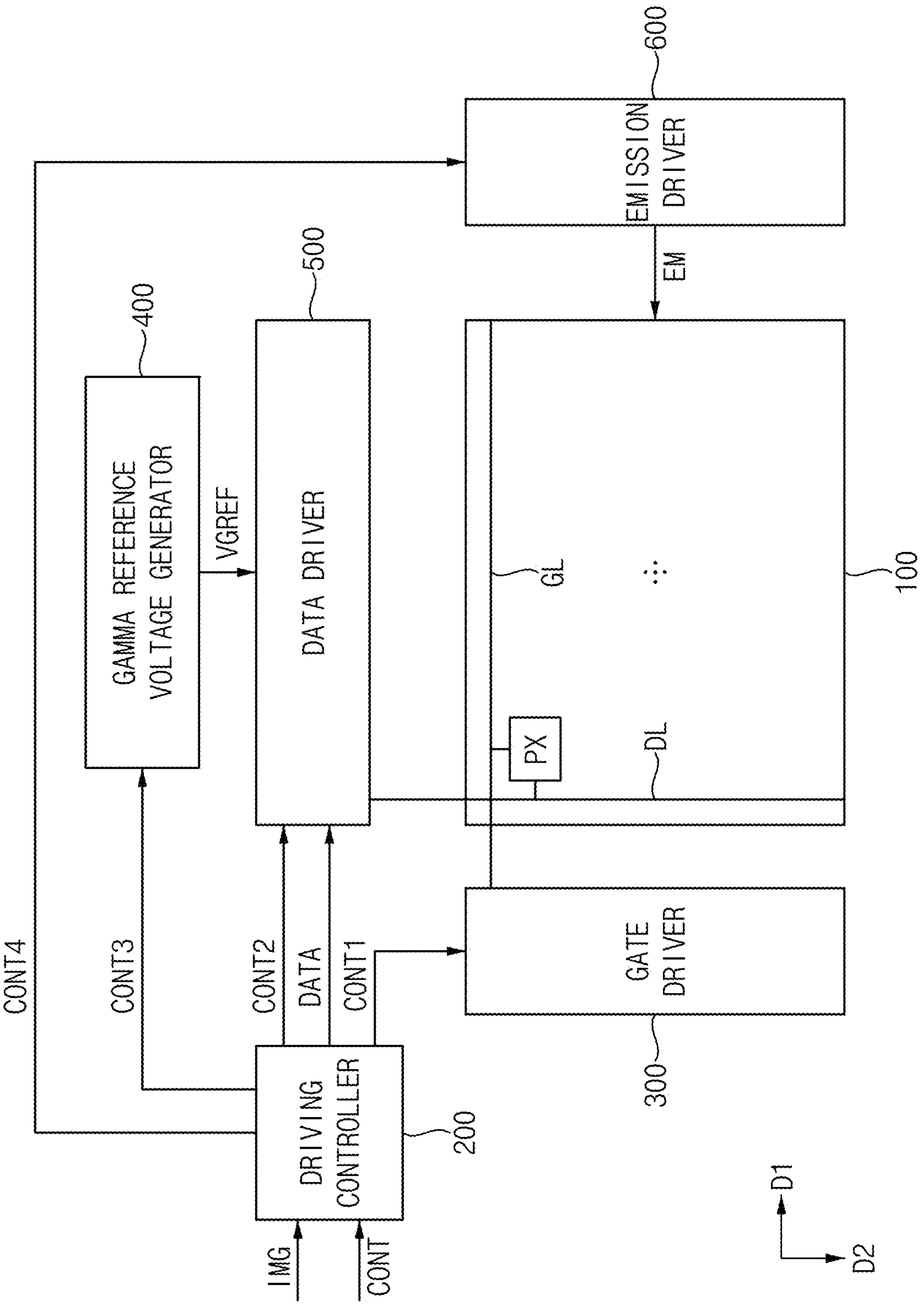
FIG. 1 is a block diagram illustrating a display apparatus according to one or more embodiments of the disclosure.

FIG. 1 is a block diagram illustrating a display apparatus according to one or more embodiments of the present disclosure.

Referring to FIG. 1, the display apparatus includes a display panel 100 and a display panel driver. The display panel driver includes a driving controller 200, a gate driver 300, a gamma reference voltage generator 400, and a data driver 500. The display panel driver may further include an emission driver 600. In one or more embodiments, the display panel driver may output an initialization voltage VINT of FIG. 2.

The display panel 100 has a display region on which an image is displayed and a peripheral region adjacent to the display region.

The display panel 100 includes a plurality of gate lines GL, a plurality of data lines DL, and a plurality of pixel circuits PX electrically connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus. For example, the input image data IMG may include red image data, green image data, and blue image data. The input image data IMG may include white image data. The input image data IMG may include magenta image data, cyan image data, and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GL in response to the first control signal CONT1 received from the driving controller 200. The gate driver 300 may output the gate signals to the gate lines GL.

In one or more embodiments, the gate driver 300 may be disposed in the peripheral region. In one or more embodiments, the gate driver 300 may be integrated in the peripheral region.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

For example, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages VDATA having an analog type using the gamma reference voltages VGREF. The data driver 500 outputs the data voltages VDATA to the data lines DL. The data voltage VDATA of FIG. 2 may have a pulse width data voltage level VPWM of FIG. 3 and a low initialization voltage level VINTL of FIG. 3.

In one or more embodiments, the data driver 500 may be disposed in the peripheral region. In one or more embodiments, the data driver 500 may be integrated in the peripheral region.

The emission driver 600 generates emission signals EM in response to the fourth control signal CONT4 received from the driving controller 200. The emission driver 600 may output the emission signals EM to the display panel 100. The emission signal EM may include a first emission signal EM1 and a second emission signal EM2 of FIG. 2.

In one or more embodiments, the emission driver 600 may be disposed in the peripheral region. In one or more embodiments, the emission driver 600 may be integrated in the peripheral region.

Figure 2:
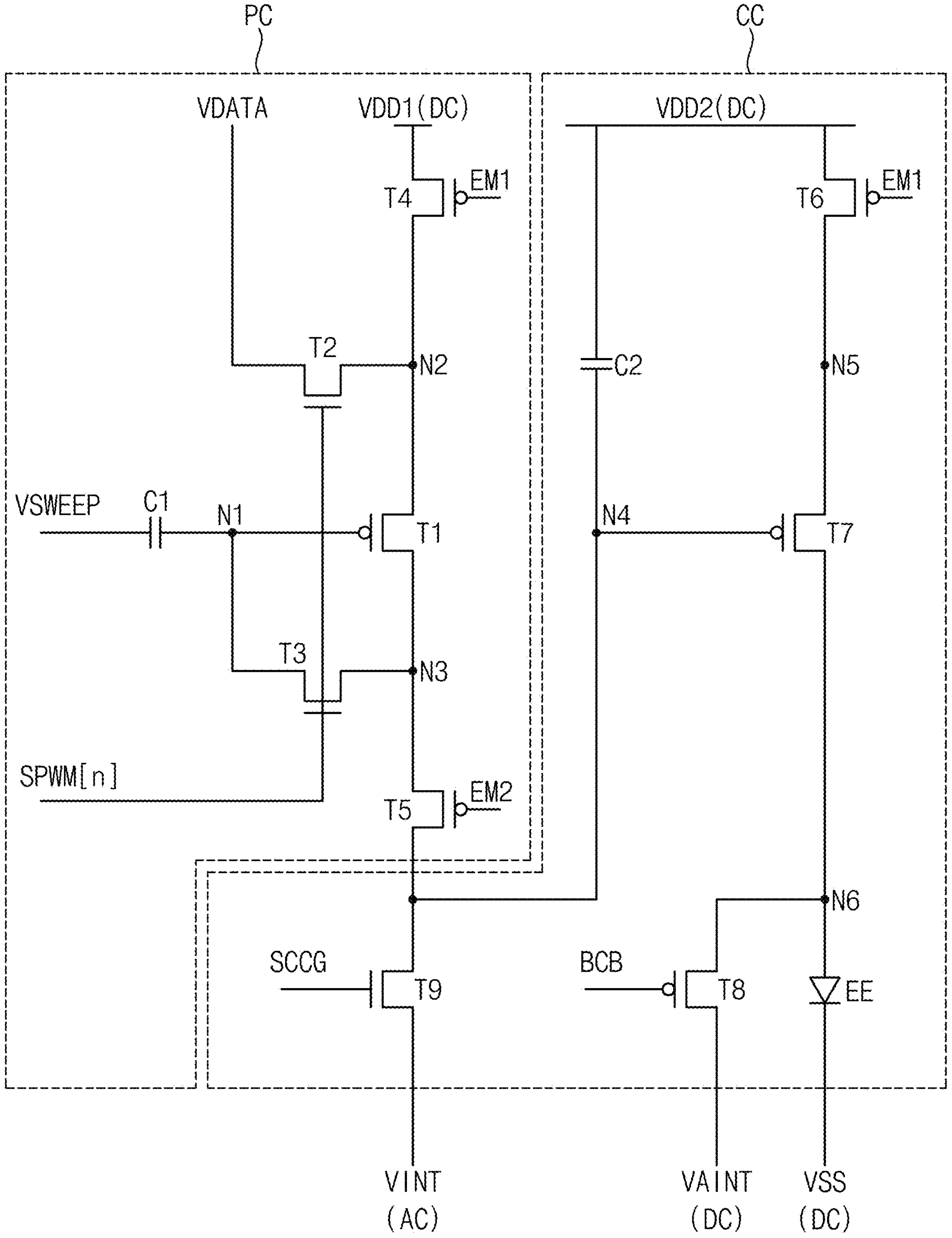
FIG. 2 is a circuit diagram illustrating an example of a pixel circuit of a display panel of FIG. 1.

FIG. 2 is a circuit diagram illustrating an example of a pixel circuit of the display panel of FIG. 1.

Referring to FIG. 1 and FIG. 2, the pixel circuit may include a first circuit PC and a second circuit CC.

The first circuit PC may be a pulse width modulation circuit for performing a pulse width modulation. The second circuit CC may be a constant current generating circuit for generating a constant current.

The first circuit PC may include first to fifth transistors T1, T2, T3, T4 and T5 and a first capacitor C1. The second CC may include sixth to ninth transistors T6, T7, T8 and T9 and a second capacitor C2. The second circuit CC may include a light emitting element EE.

For example, the light emitting element EE may be a light emitting diode (LED). In one or more embodiments, the light emitting element EE may be a micro light emitting diode. The light emitting element EE may emit light based on the pulse width data voltage level VPWM of FIG. 3 and the constant current voltage level VCCG of FIG. 3.

The pixel circuit may include the first transistor T1, the second transistor T2, the third transistor T3, the fourth transistor T4, the fifth transistor T5, the sixth transistor T6, the seventh transistor T7, the eighth transistor T8, the ninth transistor T9, the first capacitor C1, the second capacitor C2, and the light emitting element EE.

The first transistor T1 may include a control electrode connected to a first node N1, a first electrode connected to a second node N2, and a second electrode connected to a third node N3.

The second transistor T2 may include a control electrode receiving a first scan signal SPWM[n], a first electrode receiving the data voltage VDATA, and a second electrode connected to the second node N2. The second transistor T2 may apply the data voltage VDATA to the first transistor T1 in response to the first scan signal SPWM[n].

The third transistor T3 may include a control electrode receiving the first scan signal SPWM[n], a first electrode connected to the first node N1, and a second electrode connected to the third node N3. The third transistor T3 may be connected to the first node N1 and the third node N3.

The fourth transistor T4 may include a control electrode receiving the first emission signal EM1, a first electrode receiving a first power voltage VDD1, and a second electrode connected to the second node N2. The fourth transistor T4 may apply the first power voltage VDD1 to the second node N2 in response to the first emission signal EM1.

The fifth transistor T5 may include a control electrode receiving the second emission signal EM2, a first electrode connected to the third node N3, and a second electrode connected to a fourth node N4. The fifth transistor T5 may apply a voltage of the fourth node N4 to the third node N3 in response to the second emission signal EM2. The first emission signal EM1 and the second emission signal EM2 may be different.

The sixth transistor T6 may include a control electrode receiving the first emission signal EM1, a first electrode receiving a second power voltage VDD2, and a second electrode connected to a fifth node N5. The sixth transistor T6 may apply the second power voltage VDD2 to the fifth node N5 in response to the first emission signal EM1.

The seventh transistor T7 may include a control electrode connected to the fourth node N4, the first electrode connected to the fifth node N5, and a second electrode connected to a sixth node N6. The seventh transistor T7 may apply a driving current to the light emitting element EE in response to a voltage of the fourth node N4.

The eighth transistor T8 may include a control electrode receiving an initialization signal BCB, a first electrode receiving a light emitting element initialization voltage VAINT, and a second electrode connected to the sixth node N6. The eighth transistor T8 may apply the light emitting element initialization voltage VAINT to the sixth node N6 in response to the initialization signal BCB.

The ninth transistor T9 may include a control electrode receiving a second scan signal SCCG, a first electrode receiving an initialization voltage VINT, and a second electrode connected to the fourth node N4. The ninth transistor T9 may apply the initialization voltage VINT to the fourth node N4. Additionally, the ninth transistor T9 may apply the initialization voltage VINT to the first node N1. The initialization voltage may have the low initialization voltage level VINTL of FIG. 3 and the constant current voltage level VCCG of FIG. 3. The initialization voltage VINT may be an AC voltage. For example, the ninth transistor T9 may be called as an initialization transistor.

The first capacitor C1 may include a first electrode receiving a sweep signal VSWEEP and a second electrode connected to the first node N1.

The second capacitor C2 may include a first electrode receiving the second power voltage VDD2 and a second electrode connected to the fourth node N4.

Thus, the pixel circuit may include nine transistors and two capacitors.

In the present embodiment, the first transistor T1, the fourth transistor T4, the fifth transistor T5, the sixth transistor T6, the seventh transistor T7, and the eighth transistor T8 may be P-type transistors. The second transistor T2, the third transistor T3, and the ninth transistor T9 may be N-type transistors.

In the present embodiment, some transistors of the pixel circuit may be P-type transistors and other transistors may be N-type transistors. For example, the P-type transistor may be a low-temperature polycrystalline silicon (LTPS) transistor. For example, the N-type transistor may be an oxide transistor. In particular, the second transistor T2, the third transistor T3, and the ninth transistor T9 may be configured as N-type transistors, and accordingly, the current leakage of the second transistor T2, the third transistor T3, and the ninth transistor T9 may be reduced, so that the pixel circuit may operate stably even when a relatively low power voltage is used. As a result, a power consumption of the display apparatus may be reduced by configuring the second transistor T2, the third transistor T3, and the ninth transistor T9 as N-type transistors.

Figure 3:
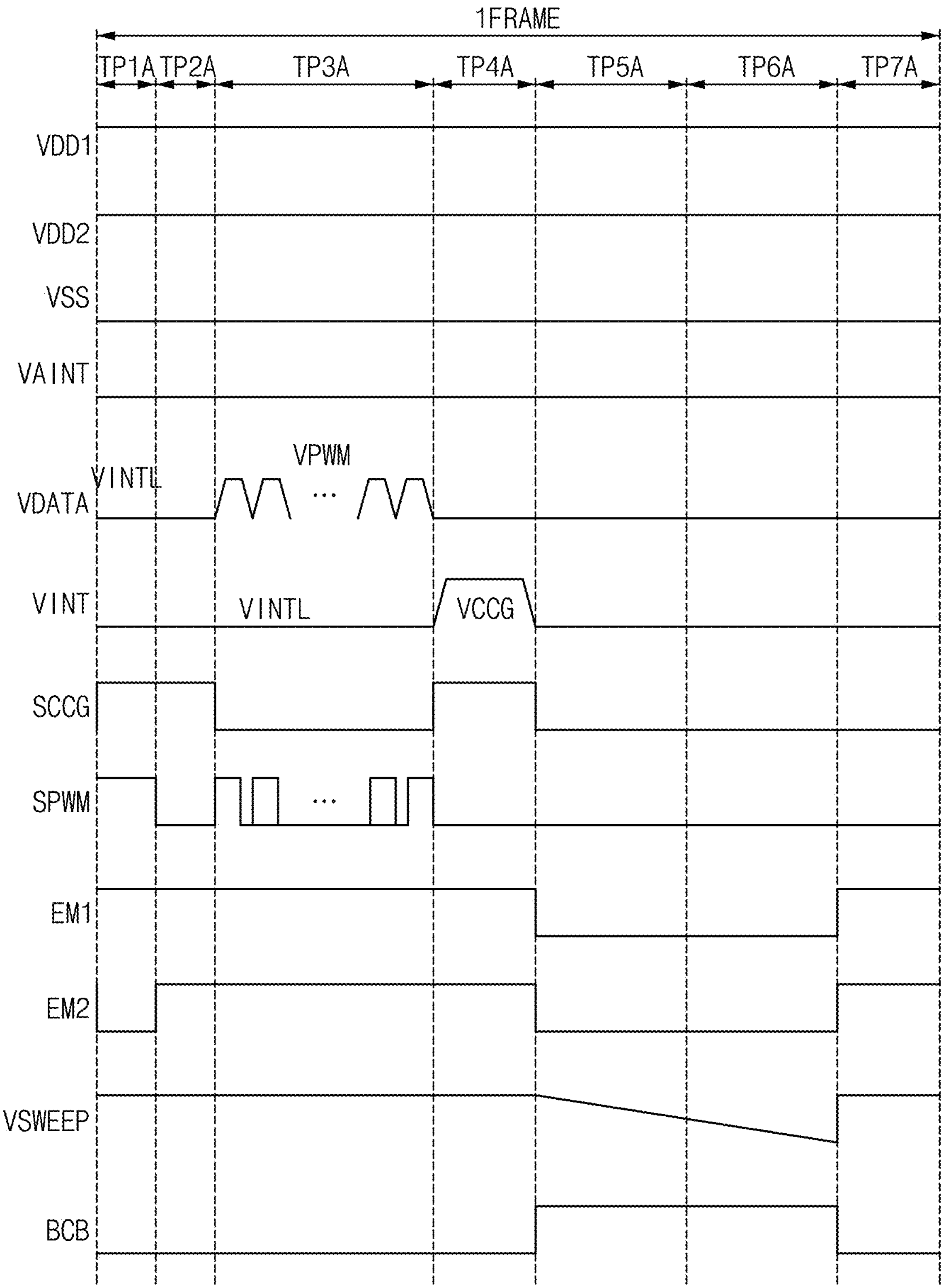
FIG. 3 is a timing diagram illustrating an example of signals applied to the pixel of FIG. 2.

In the present embodiment, the low initialization voltage level VINTL of FIG. 3 and the constant current voltage level VCCG of FIG. 3 applied to the first node N1 and the fourth node N4 may be outputted from a same voltage terminal, so that the number of transistors and the number of signal lines may be reduced.

Additionally, the ninth transistor T9 may change a voltage of the first node N1 and a voltage of the fourth node N4, so that the number of transistors may be reduced.

The pulse width data voltage level VPWM of FIG. 3 may have the same or different sizes according to the emission intensity of each pixel. The constant current voltage level VCCG of FIG. 3 may have the same size voltage level for all pixels. Alternatively, the constant current voltage level VCCG of FIG. 3 may have a first voltage level for a red pixel, a second voltage level different from the first voltage level for a green pixel, and a third voltage level different from the first voltage level and the second voltage level for a blue pixel.

For example, the first power voltage VDD1 and the second power voltage VDD2 may be high power voltages for determining the light emission level of the light emitting element EE, and the third power voltage VSS may be a low power voltage for determining the light emission level of the light emitting element EE. The first power voltage VDD1 and the second power voltage VDD2 may be higher than the third power voltage VSS.

Additionally, the first power voltage VDD1 may be higher than the second power voltage VDD2.

In an emission period, during the first transistor T1 is turned off and the seventh transistor T7 is turned on, the light emitting element EE may emit light. In an emission-off period, when the first transistor T1 is turned on and the first power voltage VDD1 is applied to the control electrode of the seventh transistor T7, the seventh transistor T7 may be turned off and the light emitting element EE may stop emission.

At this time, when the first power voltage VDD1 becomes greater than the second power voltage VDD2, when the first power voltage VDD1 is applied to the control electrode of the seventh transistor T7, the seventh transistor T7 may more reliably maintain a turn-off state.

For example, the light emitting element initialization voltage VAINT may be lower than the third power voltage VSS. When the light emitting element initialization voltage VAINT is lower than the third power voltage VSS, a leakage current may be prevented from flowing into the light emitting element EE.

In the present embodiment, the first scan signal SPWM[n] may be a progressive scan signal having different timing for each pixel row. Herein, [n] may mean a n-th pixel row. The pixel circuit of FIG. 2 to which the first scan signal SPWM[n] is applied may be a pixel circuit included in the n-th pixel row.

The initialization signal BCB and the second scan signal SCCG may be global scan signals having the same timing regardless of the pixel row. The first emission signal EM1 and the second emission signal EM2 may also be global scan signals having the same timing regardless of the pixel row.

The first power voltage VDD1, the second power voltage VDD2, the third power voltage VSS and the light emitting element initialization voltage VAINT may be direct current voltages. On the other hand, the initialization voltage VINT may be an alternating current voltage.

Figure 4:
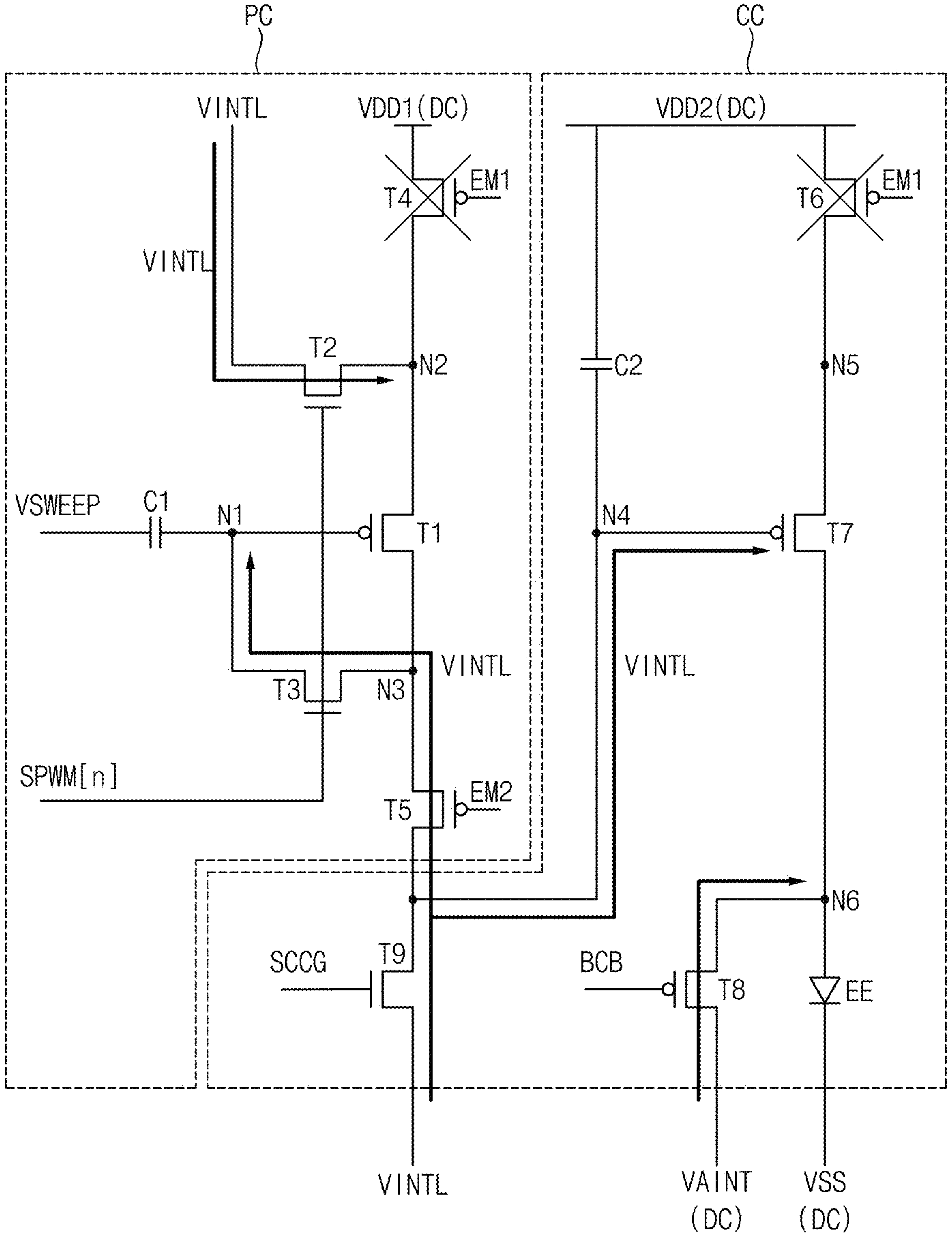
FIG. 4 is a circuit diagram illustrating an operation of the pixel circuit of FIG. 2 in a first period.
Figure 5:
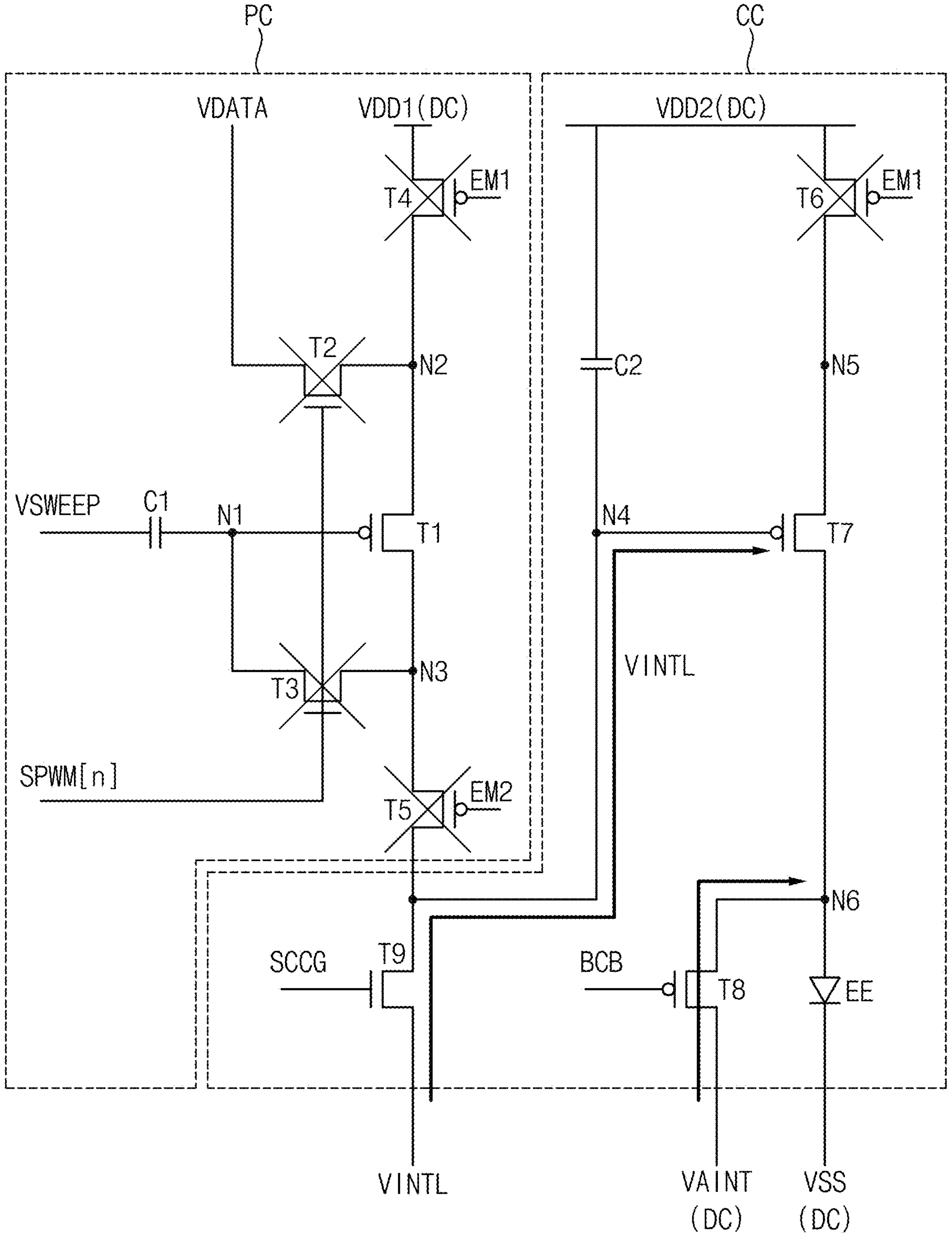
FIG. 5 is a circuit diagram illustrating an operation of the pixel circuit of FIG. 2 in a second period.
Figure 6:
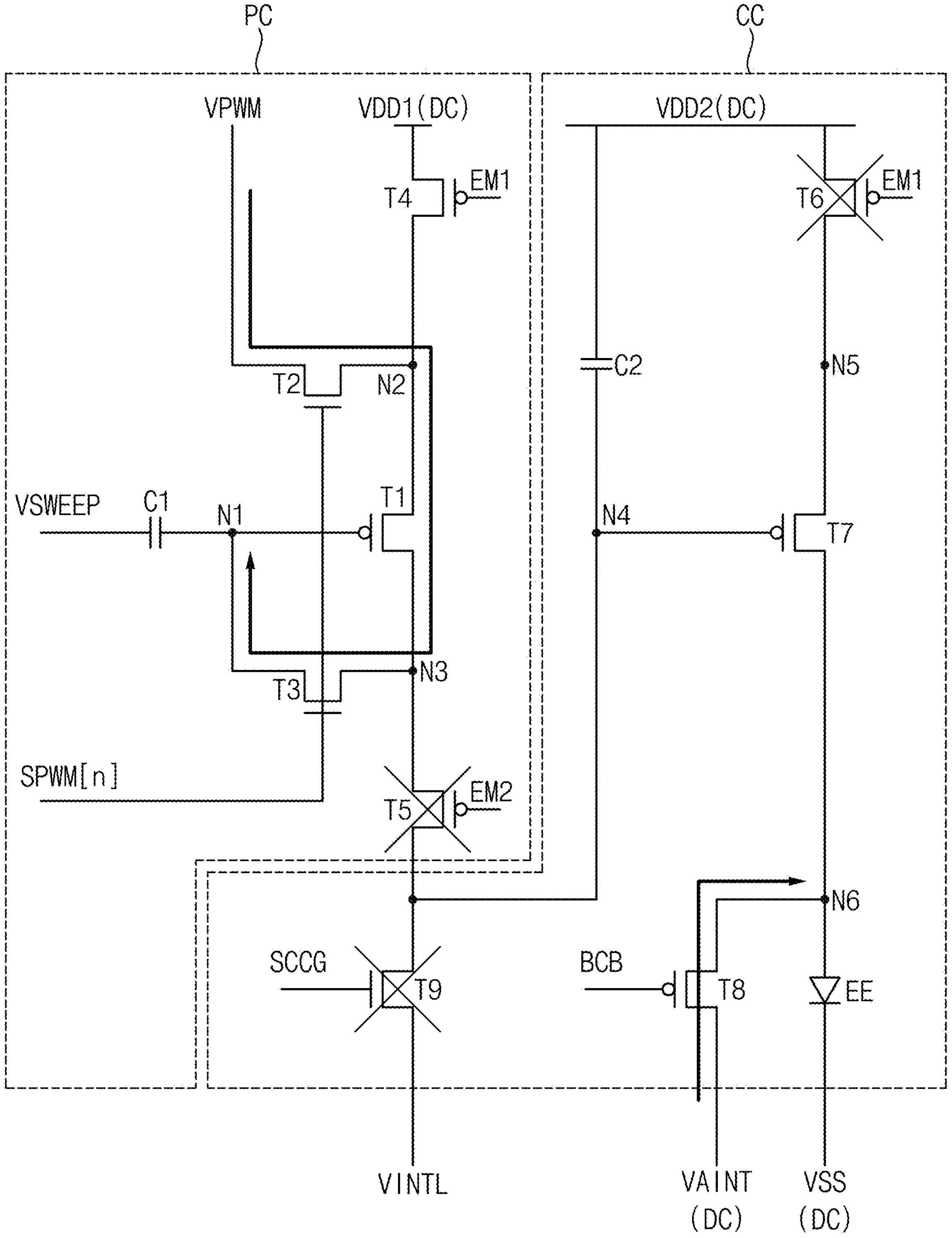
FIG. 6 is a circuit diagram illustrating an operation of the pixel circuit of FIG. 2 in a third period.
Figure 7:
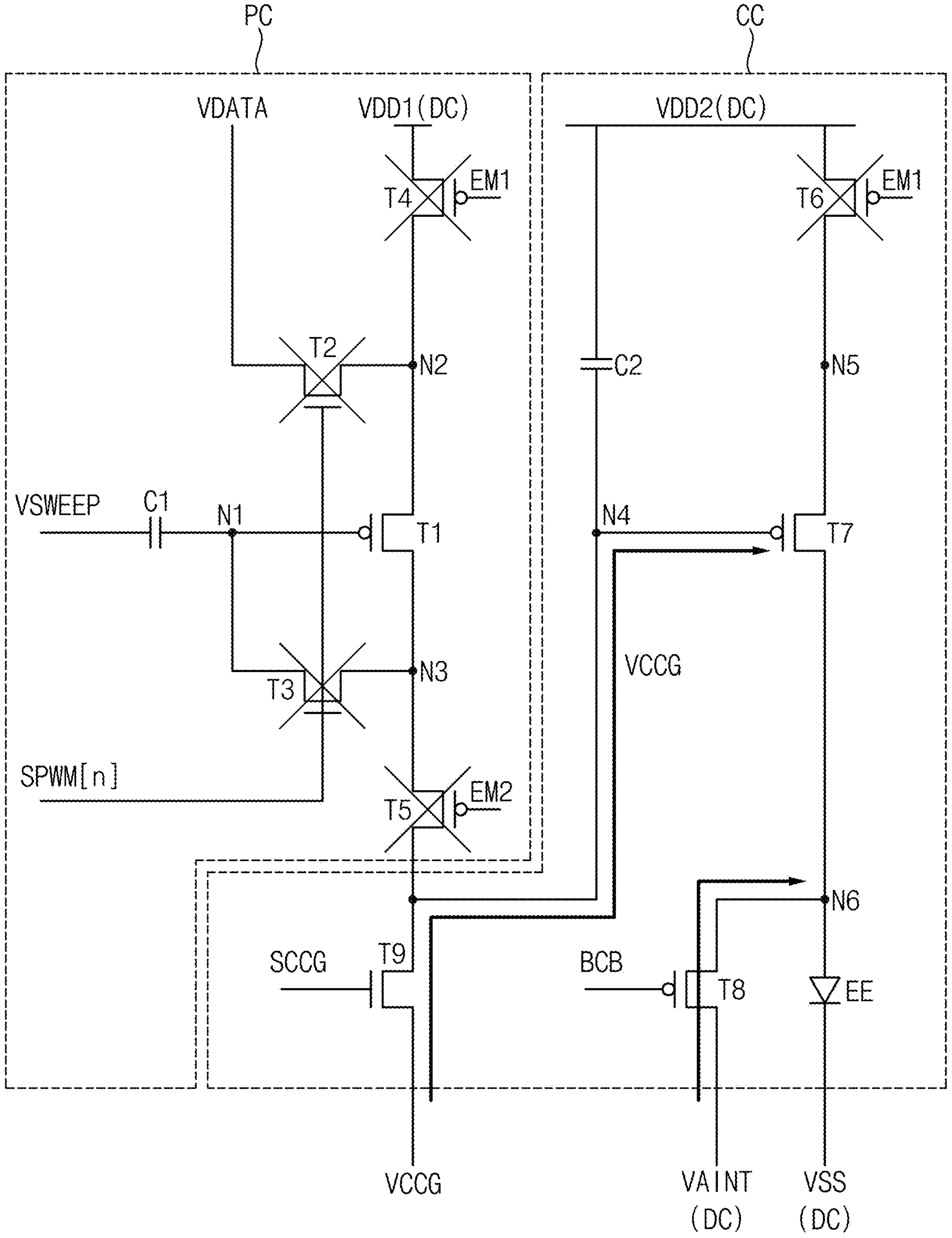
FIG. 7 is a circuit diagram illustrating an operation of the pixel circuit of FIG. 2 in a fourth period.
Figure 8:
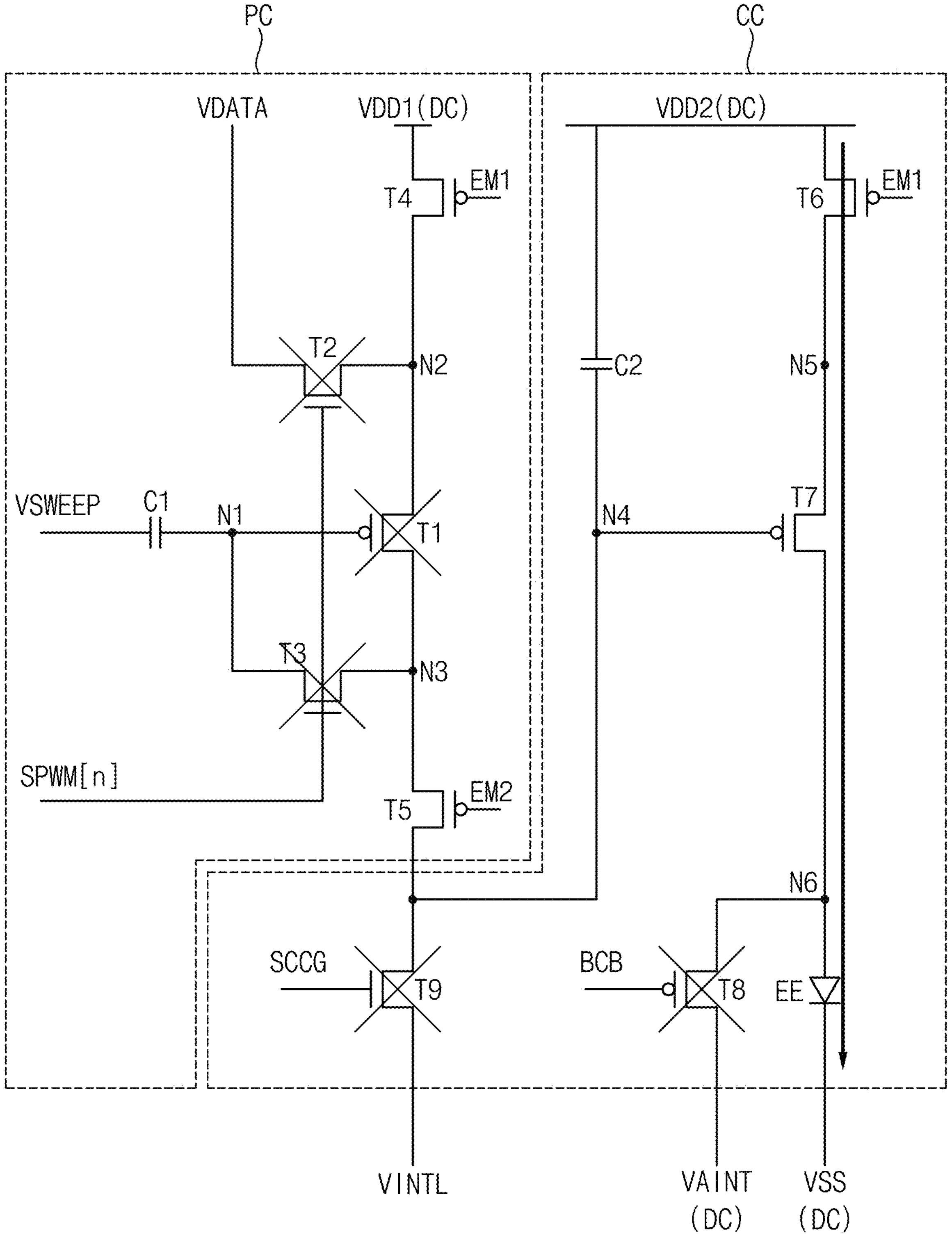
FIG. 8 is a circuit diagram illustrating an operation of the pixel circuit of FIG. 2 in a fifth period.
Figure 9:
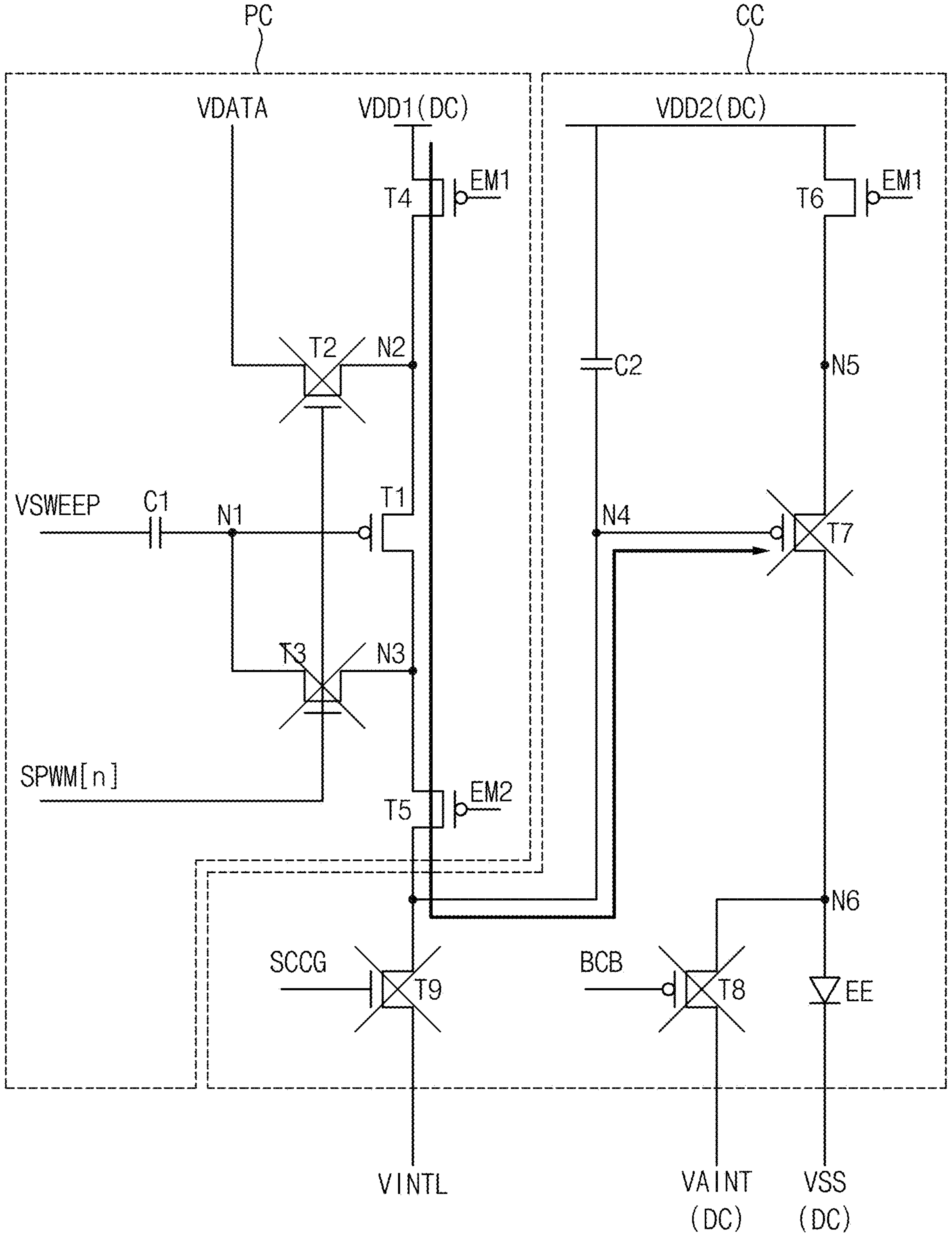
FIG. 9 is a circuit diagram illustrating an operation of the pixel circuit of FIG. 2 in a sixth period.
Figure 10:
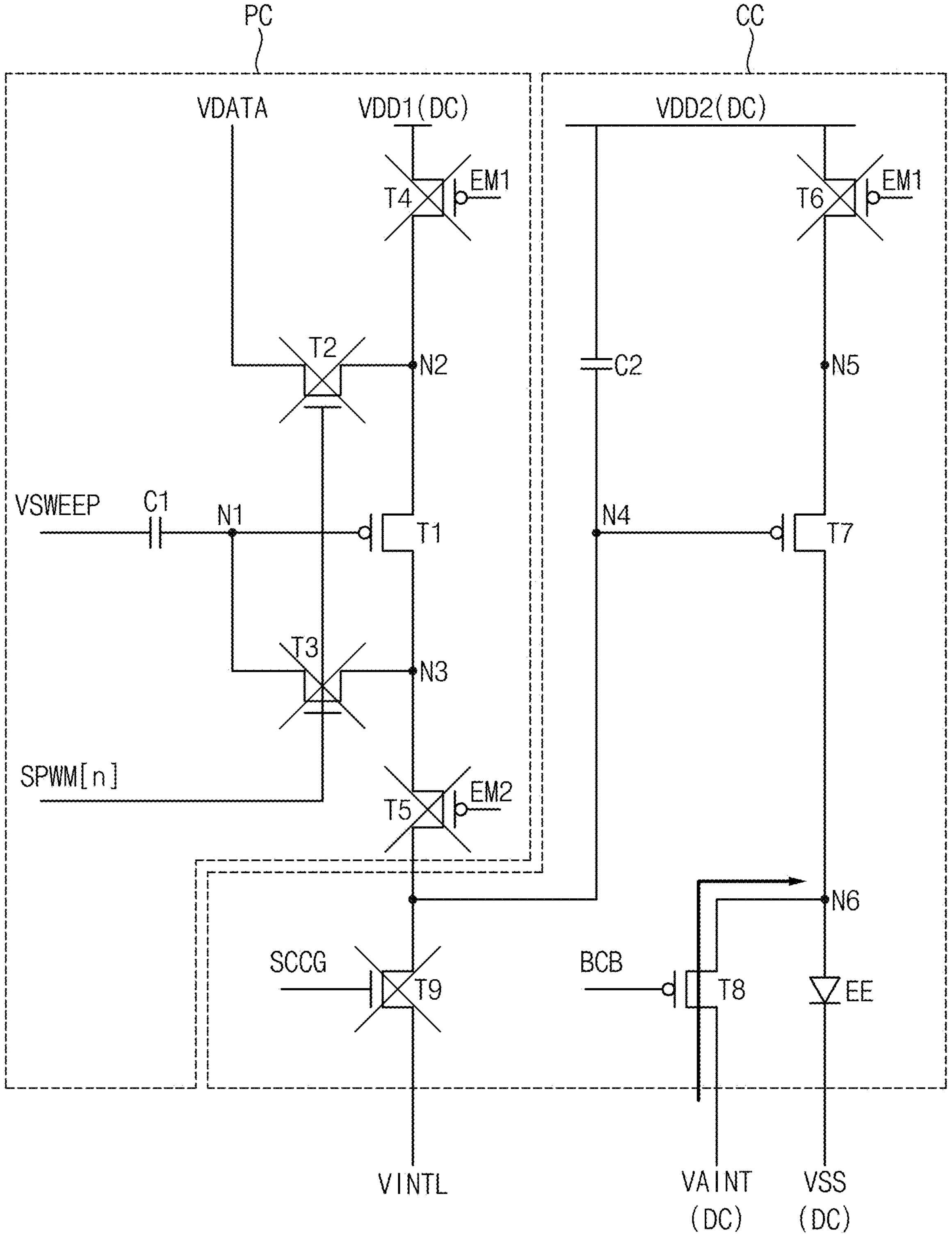
FIG. 10 is a circuit diagram illustrating an operation of the pixel circuit of FIG. 2 in a seventh period.

FIG. 3 is a timing diagram illustrating an example of signals applied to a pixel of FIG. 2. FIG. 4 is a circuit diagram illustrating an operation of the pixel circuit of FIG. 2 in a first period TP1A. FIG. 5 is a circuit diagram illustrating an operation of the pixel circuit of FIG. 2 in a second period TP2A. FIG. 6 is a circuit diagram illustrating an operation of the pixel circuit of FIG. 2 in a third period TP3A. FIG. 7 is a circuit diagram illustrating an operation of the pixel circuit of FIG. 2 in a fourth period TP4A. FIG. 8 is a circuit diagram illustrating an operation of the pixel circuit of FIG. 2 in a fifth period TP5A. FIG. 9 is a circuit diagram illustrating an operation of the pixel circuit of FIG. 2 in a sixth period TP6A. FIG. 10 is a circuit diagram illustrating an operation of the pixel circuit of FIG. 2 in a seventh period TP7A.

In the present embodiment, a first period TP1A may be a first initialization period, a second period TP2A may be a second initialization period, a third period TP3A may be a pulse width modulation data writing and compensation period, a fourth period TP4A may be a constant current voltage writing period, a fifth period TP5A may be an emission period, a sixth period TP6A may be an emission-off period, and a seventh period TP7A may be a discharging period.

A width of the fifth period TP5A, which is the emission period, may be determined by the pulse width data voltage level VPWM.

Referring to FIG. 3 and FIG. 4, in the first period TP1A, the data voltage VDATA may have the low initialization voltage level VINTL, the initialization voltage VINT may have the low initialization voltage level VINTL, the initialization signal BCB may have an activation level, the first scan signal SPWM[n] may have an activation level, the second scan signal SCCG may have an activation level, the first emission signal EM1 may have an inactivation level, the second emission signal EM2 may have an activation level and the sweep signal VSWEEP may have a high level.

Herein, when a transistor that receives the initialization signal BCB, the first scan signal SPWM[n], the second scan signal SCCG, the first emission signal EM1, and the second emission signal EM2 is a P-type transistor, an activation level is a low level and an inactivation level is a high level. When a transistor that receives the initialization signal BCB, the first scan signal SPWM[n], the second scan signal SCCG, the first emission signal EM1 and the second emission signal EM2 is an N-type transistor, an activation level is a high level and an inactivation level is a low level.

The first period TP1A may be the first initialization period. In the first period TP1A, the third transistor T3, the fifth transistor T5, the eighth transistor T8 and the ninth transistor T9 may be turned on. In the first period TP1A, the fourth transistor T4 may be turned off.

In the first period TP1A, the control electrode of the first transistor T1 may be initialized as the low initialization voltage level VINTL through the ninth transistor T9. In the first period TP1A, the second node N2 may be initialized as the low initialization voltage level VINTL through the second transistor T2. In the first period TP1A, a first electrode (e.g., an anode) of the light emitting element EE may be initialized as the light emitting element initialization voltage VAINT through the eighth transistor T8.

Referring to FIG. 3 and FIG. 5, in the second period TP2A following to the first period TP1A, the initialization voltage VINT may have the low initialization voltage level VINTL, the initialization signal BCB may have an activation level, the first scan signal SPWM[n] may have an activation level, the second scan signal SCCG may have an activation level, the first emission signal EM1 may have an inactivation level, the second emission signal EM2 may have an inactivation level, and the sweep signal VSWEEP may have a high level.

The second period TP2A may be the second initialization period. In the second period TP2A, the fifth transistor T5 may be turned off. In the second period TP2A, the eighth transistor T8 and the ninth transistor T9 may be turned on.

In the second period TP2A, the fourth node N4 may be initialized as the low initialization voltage level VINTL through the ninth transistor T9. In the second period TP2A, the first electrode (e.g., the anode) of the light emitting element EE may be initialized as the light emitting element initialization voltage VAINT through the eighth transistor T8.

Referring to FIG. 3 and FIG. 6, in the third period TP3A following to the second period TP2A, the initialization voltage VINT may have the low initialization voltage level VINTL, the first scan signal SPWM[n] may have an activation level, the second scan signal SCCG may have an inactivation level, the first emission signal EM1 may have an inactivation level, the second emission signal EM2 may have an inactivation level, the sweep signal VSWEEP may have a high level and the initialization signal BCB may have an activation level.

The third period TP3A may be the pulse width modulation data writing and compensation period. In the third period TP3A, the second transistor T2 may be turned on in response to the first scan signal SPWM[n]. Because the first node N1 may have the low initialization voltage level VINTL in the first period TP1A, the first transistor T1 may be turned on in the third period TP3A. The third transistor T3 may be turned on in response to the first scan signal SPWM[n]. In the third period TP3A, the eighth transistor T8 may maintain a turned on state.

In the third period TP3A, through a path of the second transistor T2, the first transistor T1, and the third transistor T3, the pulse width data voltage level VPWM may be applied to the control electrode of the first transistor T1 (e.g., the first node N1). By the third transistor T3, which is diode connected, a threshold voltage of the transistor T1 may be compensated from the pulse width data voltage level VPWM.

In the third period TP3A, a voltage level of the control electrode of the first transistor T1 may be VPWM+Vth_T1. Herein, the Vth_T1 may be the threshold voltage of the first transistor T1. In the third period TP3A, when the VPWM+Vth_T1 is completely stored in the control electrode of the first transistor T1 (e.g., the first node N1), the first transistor T1 may be turned off.

In the third period TP3A, the fifth transistor T5 may be turned off in response to the second emission signal EM2. Accordingly, a voltage of the fourth node N4 may be maintained as the low initialization voltage level VINTL.

Referring to FIG. 3 and FIG. 7, in the fourth period TP4A following to the third period TP3A, the initialization signal BCB may have an activation level, the first scan signal SPWM[n] may have an inactivation level, the second scan signal SCCG may have an activation level, the first emission signal EM1 may have an inactivation level, the second emission signal EM2 may have an inactivation level, the sweep signal VSWEEP may have the high level and the initialization voltage VINT may have the constant current voltage level VCCG.

The fourth period TP4A may be the constant current voltage writing period. In the fourth period TP4A, the ninth transistor T9 may be turned on in response to the second scan signal SCCG. In the fourth period TP4A, the eighth transistor T8 may maintain a turned on state.

In the fourth period TP4A, through the ninth transistor T9, the constant current voltage level VCCG may be applied to the control electrode of the seventh transistor T7. In the fourth period TP4A, when the constant current voltage level VCCG is applied to the control electrode of the seventh transistor T7, the seventh transistor T7 may be turned on.

Referring to FIG. 3 and FIG. 8, in the fifth period TP5A following to the fourth period TP4A, the initialization signal BCB may have an inactivation level, the first scan signal SPWM[n] may have an inactivation level, the second scan signal SCCG may have an inactivation level, the first emission signal EM1 may have an activation level, the second emission signal EM2 may have an activation level, and the sweep signal VSWEEP may be gradually decreased from the high level.

The fifth period TP5A may be the emission period. In the fifth period TP5A, the fourth transistor T4 and the sixth transistor T6 may be turned on in response to the first emission signal EM1. The fifth transistor T5 may be turned on in response to the second emission signal EM2 and the seventh transistor T7 may be turned on in response to the constant current voltage level VCCG.

In the fifth period TP5A, by a current flowing through a path of the sixth transistor T6, the seventh transistor T7, and the light emitting element EE, the light emitting element EE may emit light. A driving current applied to the light emitting element EE may be generated based on the constant current voltage level VCCG.

Referring to FIG. 3 and FIG. 9, in the sixth period TP6A following to the fifth period TP5A, the initialization signal BCB may have an inactivation level, the first scan signal SPWM[n] may have an inactivation level, the second scan signal SCCG may have an inactivation level, the first emission signal EM1 may have an activation level, the second emission signal EM2 may have an activation level and the sweep signal VSWEEP may continue to be gradually decreased following the fifth period TP5A.

The sixth period TP6A may be the emission-off period. As the sweep signal VSWEEP is decreased, at a certain point in time, the first transistor T1 may be turned on. For example, the certain point may mean that a voltage of the first node N1 has a activation level of the first transistor T1. A timepoint at which the first transistor T1 is turned on may be determined by the pulse width data voltage level VPWM applied to the control electrode of the transistor T1.

When the first transistor T1 is turned on, through a path of the fourth transistor T4, the first transistor T1 and the fifth transistor T5, the first power voltage VDD1 may be applied to the control electrode of the seventh transistor T7.

When the first power voltage VDD1 is applied to the control electrode of the seventh transistor T7 and the seventh transistor T7 is turned off, the light emitting element EE may stop emission.

Referring to FIG. 3 and FIG. 10, in the seventh period TP7A following to the sixth period TP6A, the initialization signal BCB may have an activation level, the first scan signal SPWM[n] may have an inactivation level, the second scan signal SCCG may have an inactivation level, the first emission signal EM1 may have an inactivation level, the second emission signal EM2 may have an inactivation level, and the sweep signal VSWEEP may have the high level.

The seventh period TP7A may be the discharging period. In the seventh period TP7A, the first electrode (e.g., the anode) of the light emitting element EE may be initialized as the light emitting element initialization voltage VAINT through the eighth transistor T8.

According to the present embodiment, the pixel circuit may include nine transistors and two capacitors. The pixel circuit may be driven by pulse width modulation, perform an internal compensation of threshold voltage, and include a small number of transistors compared with conventional pixel circuit, so that the pixel circuit may have a high integration. Accordingly, the pixel circuit may be applied to an ultra-high resolution display apparatus.

Additionally, at least one transistor of the pulse width modulation circuit PC and at least one transistor of the constant current generating circuit CC may be N-type transistors, so that a power consumption may be reduced.

Additionally, the first transistor T1 of the pulse width modulation circuit PC and the seventh transistor T7 of the constant current generating circuit CC may be P-type transistors, so that mobility may be improved.

Additionally, the light emitting element initialization voltage VAINT applied to the second electrode of the eighth transistor T8 may be lower than the third power voltage VSS applied to a cathode of the light emitting element EE, so that black characteristic of the pixel circuit may be improved.

Additionally, the low initialization voltage level VINTL applied to the control electrode of the first transistor T1 and the constant current voltage level VCCG applied to the control electrode of the seventh transistor T7 may be outputted from a same voltage terminal, so that the number of the transistors and the number of the signal lines may be reduced.

Additionally, through the second emission signal EM2 and the fifth transistor T5, the ninth transistor T9 may apply the low initialization voltage level VINTL to the first node N1. Accordingly, the ninth transistor T9 may be a transistor for initializing the first node N1 and a transistor for applying the constant current voltage level VCCG to the fourth node N4. Accordingly, an integration of the pixel circuit may be improved.

Figure 11:
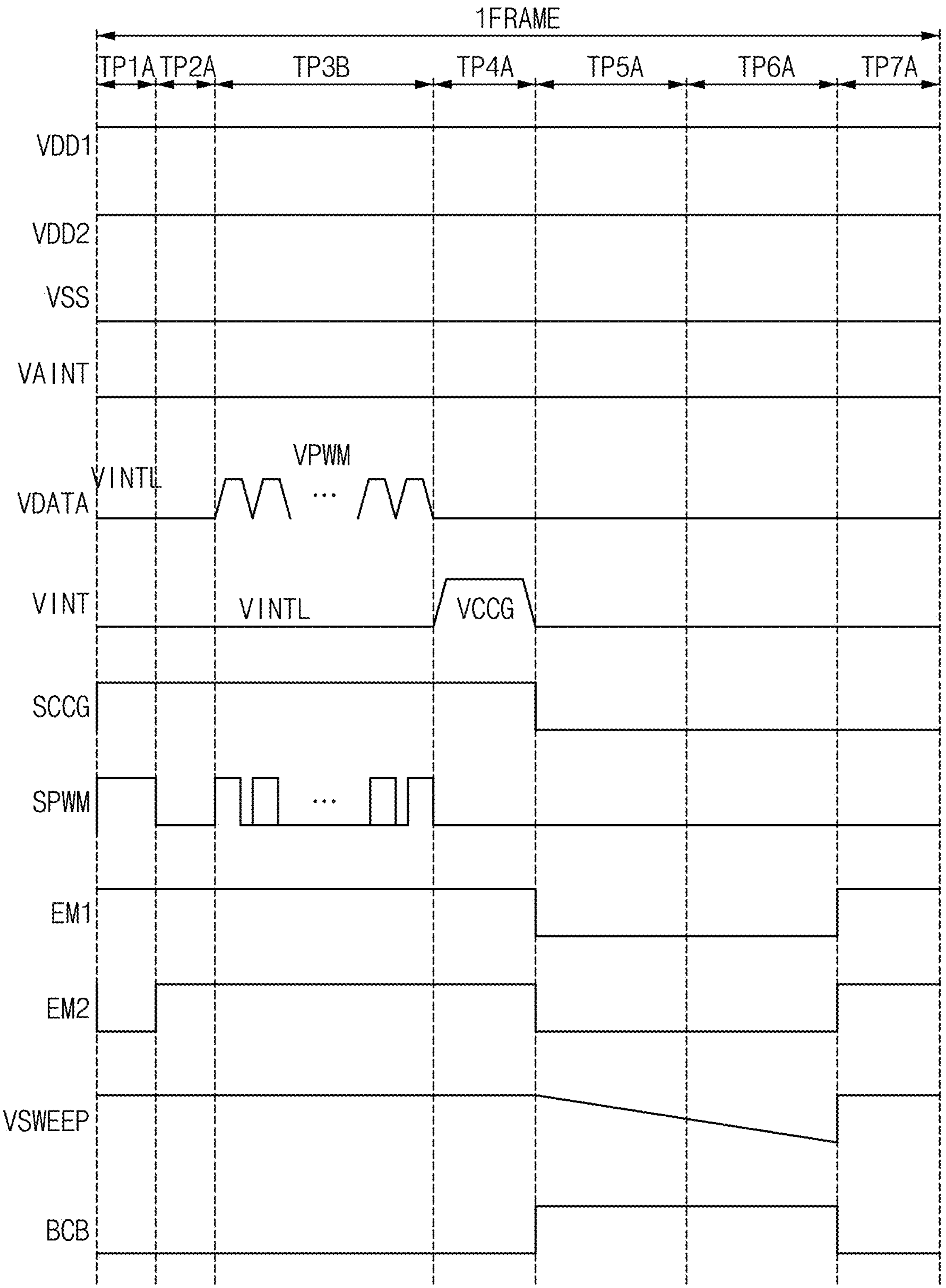
FIG. 11 is a timing diagram illustrating an example of signals applied to the pixel circuit of FIG. 2.

FIG. 11 is a timing diagram illustrating an example of signals applied to a pixel circuit of FIG. 2.

A driving timing of a pixel circuit according to the present embodiment is substantially same as the driving timing described with referring to FIG. 4-FIG. 10 except for timing of the second scan signal SCCG in the third period TP3B, so that the same reference numerals will be used and any repetitive explanation concerning the above elements will be omitted.

In the present embodiment, in the second period TP2A, the initialization voltage VINT may have the low initialization voltage level VINTL, the initialization signal BCB may have an activation level, the first scan signal SPWM[n] may have an inactivation level, the second scan signal SCCG may have an activation level, the first emission signal EM1 may have an inactivation level, the second emission signal EM2 may have an inactivation level, and the sweep signal VSWEEP may have the high level.

In the third period TP3A following to the second period TP2A, the initialization voltage VINT may have the low initialization voltage level VINTL, the first scan signal SPWM[n] may have an activation level, the second scan signal SCCG may have an activation level, the first emission signal EM1 may have an inactivation level, the second emission signal EM2 may have an inactivation level, the sweep signal VSWEEP may have the high level, and the initialization signal BCB may have an activation level.

According to the present embodiment, the pixel circuit may include nine transistors and two capacitors. The pixel circuit may be driven by pulse width modulation, perform an internal compensation of threshold voltage, and include a small number of transistors compared with conventional pixel circuit, so that the pixel circuit may have a high integration. Accordingly, the pixel circuit may be applied to an ultra-high resolution display apparatus.

Additionally, at least one transistor of the pulse width modulation circuit PC and at least one transistor of the constant current generating circuit CC may be N-type transistors, so that a power consumption may be reduced.

Additionally, the first transistor T1 of the pulse width modulation circuit PC and the seventh transistor T7 of the constant current generating circuit CC may be P-type transistors, so that mobility may be improved.

Additionally, the light emitting element initialization voltage VAINT applied to the second electrode of the eighth transistor T8 may be lower than the third power voltage VSS applied to a cathode of the light emitting element EE, so that black characteristic of the pixel circuit may be improved.

Additionally, the low initialization voltage level VINTL applied to the control electrode of the first transistor T1 and the constant current voltage level VCCG applied to the control electrode of the seventh transistor T7 may be outputted from a same voltage terminal, so that the number of the transistors and the number of the signal lines may be reduced.

Additionally, through the second emission signal EM2 and the fifth transistor T5, the ninth transistor T9 may apply the low initialization voltage level VINTL to the first node N1. Accordingly, the ninth transistor T9 may be a transistor for initializing the first node N1 and a transistor for applying the constant current voltage level VCCG to the fourth node N4. Accordingly, an integration of the pixel circuit may be improved.

Figure 12:
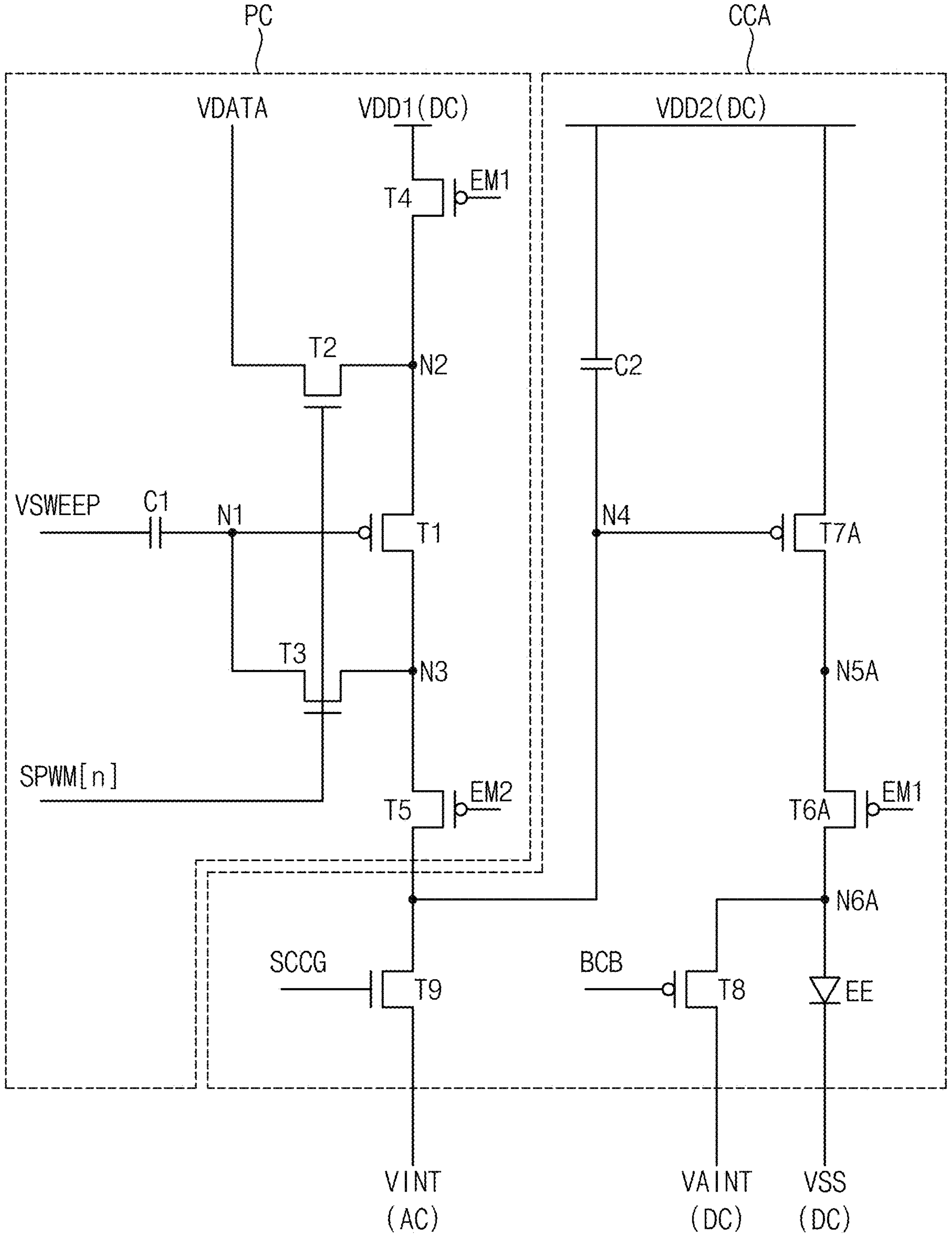
FIG. 12 is a circuit diagram illustrating an example of the pixel circuit of FIG. 2.

FIG. 12 is a circuit diagram illustrating an example of a pixel circuit of the display panel 100 of FIG. 2.

Referring to FIG. 12, a pixel circuit of FIG. 12 is substantially same as the pixel circuit of FIG. 2 except that some element of the second circuit CCA is different, so that the same reference numerals will be used and any repetitive explanation concerning the above elements will be omitted.

The second circuit CCA may include a sixth transistor T6A and a seventh transistor T7A. The sixth transistor T6A may include a control electrode receiving the first emission signal EM1, a first electrode connected to a fifth node N5A and a second electrode connected to a sixth node N6A. The seventh transistor T7A may include a control electrode connected to the fourth node N4, a first electrode receiving the second power voltage VDD2 and a second electrode connected to the fifth node N5A. The first electrode of the light emitting element EE may be connected to the sixth node N6A.

According to the present embodiment, the pixel circuit may include nine transistors and two capacitors. The pixel circuit may be driven by pulse width modulation, perform an internal compensation of threshold voltage, and include a small number of transistors compared with conventional pixel circuit, so that the pixel circuit may have a high integration. Accordingly, the pixel circuit may be applied to an ultra-high resolution display apparatus.

Additionally, at least one transistor of the pulse width modulation circuit PC and at least one transistor of the constant current generating circuit CC may be N-type transistors, so that a power consumption may be reduced Additionally, the first transistor T1 of the pulse width modulation circuit PC and the seventh transistor T7 of the constant current generating circuit CC may be P-type transistors, so that mobility may be improved.

Additionally, the light emitting element initialization voltage VAINT applied to the second electrode of the eighth transistor T8 may be lower than the third power voltage VSS applied to a cathode of the light emitting element EE, so that black characteristic of the pixel circuit may be improved.

Additionally, the low initialization voltage level VINTL applied to the control electrode of the first transistor T1 and the constant current voltage level VCCG applied to the control electrode of the seventh transistor T7 may be outputted from a same voltage terminal, so that the number of the transistors and the number of the signal lines may be reduced.

Additionally, through the second emission signal EM2 and the fifth transistor T5, the ninth transistor T9 may apply the low initialization voltage level VINTL to the first node N1. Accordingly, the ninth transistor T9 may be a transistor for initializing the first node N1 and a transistor for applying the constant current voltage level VCCG to the fourth node N4. Accordingly, an integration of the pixel circuit may be improved.

Figure 13:
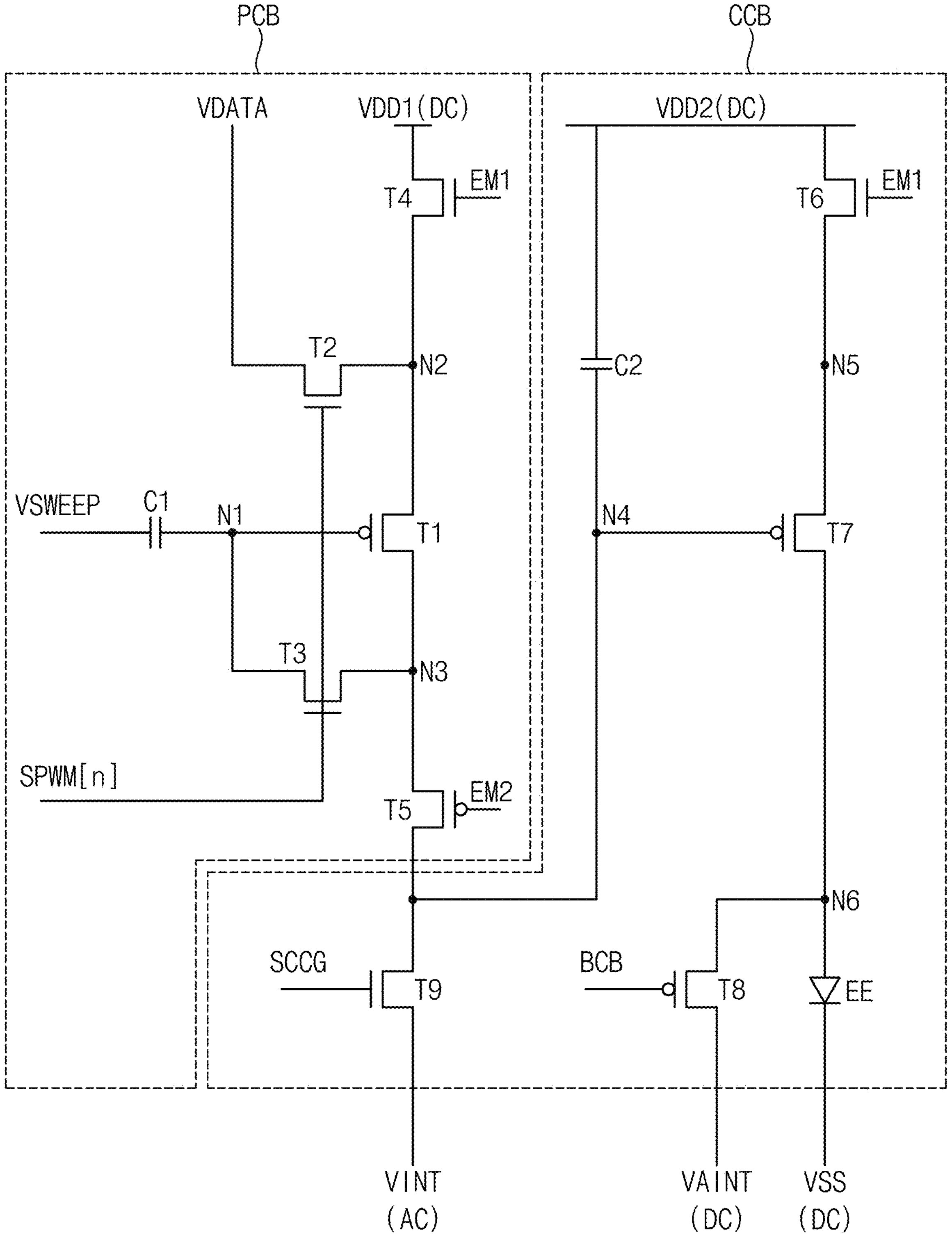
FIG. 13 is a circuit diagram illustrating an example of a pixel circuit of the display panel of FIG. 1.

FIG. 13 is a circuit diagram illustrating an example of a pixel circuit of the display panel 100 of FIG. 1.

Referring to FIG. 13, a pixel circuit of FIG. 13 is substantially same as the pixel circuit of FIG. 2 except that the fourth transistor T4 and the sixth transistor T6 are N-type transistors, so that the same reference numerals will be used and any repetitive explanation concerning the above elements will be omitted.

In the present embodiment, the pixel circuit may include a first circuit PCB and a second circuit CCB. In the present embodiment, the fourth transistor T4 and the sixth transistor T6 may be N-type transistors. Accordingly, a current leakage may be further reduced, so that the pixel circuit may be operated more stably. Additionally, a power consumption of the display apparatus may be further reduced.

Figure 14:
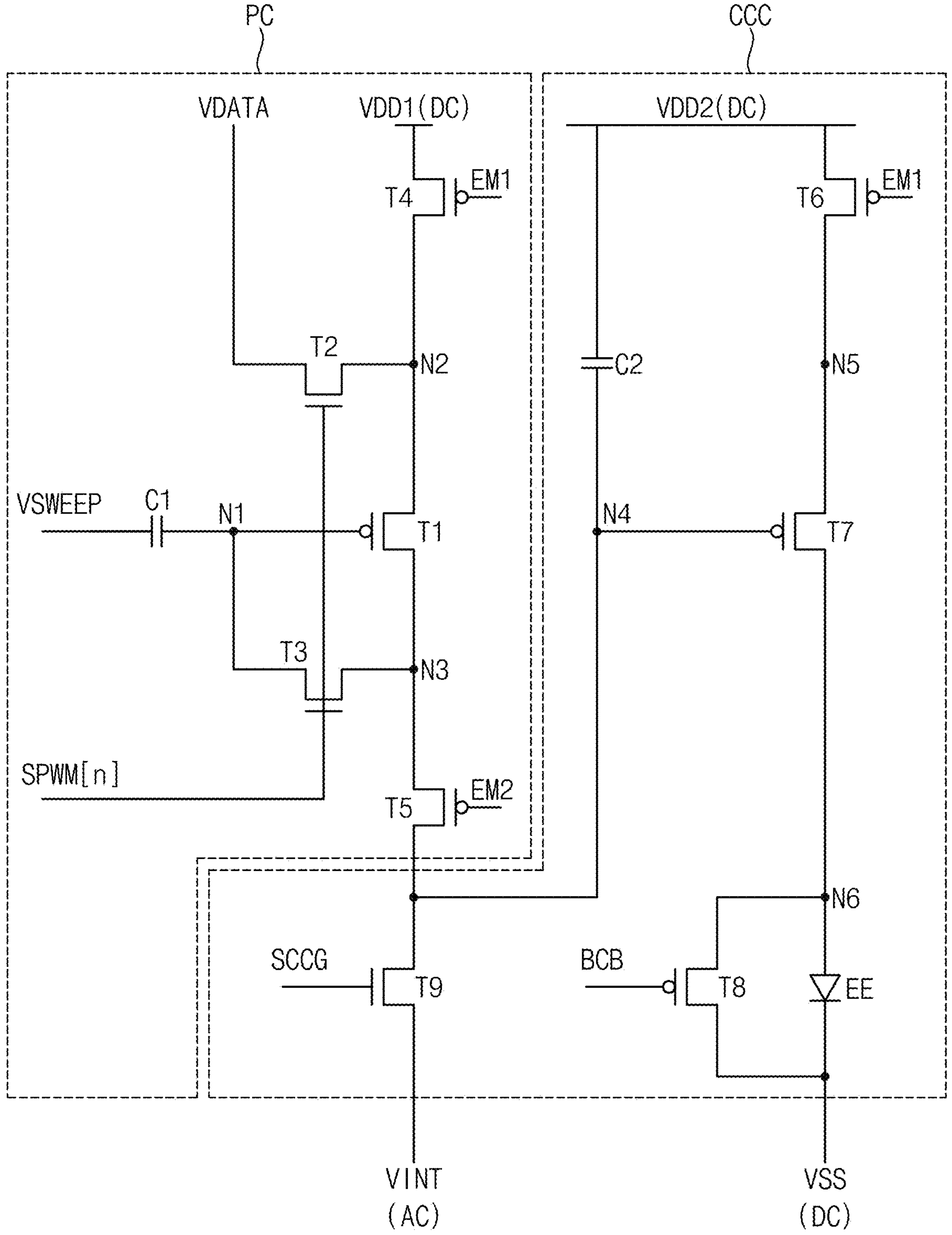
FIG. 14 is a circuit diagram illustrating an example of a pixel circuit of the display panel of FIG. 1.

FIG. 14 is a circuit diagram illustrating an example of a pixel circuit of a display panel 100 of FIG. 1.

Referring to FIG. 14, a pixel circuit of FIG. 14 is substantially same as the pixel circuit of FIG. 2 except that the third power voltage VSS is applied to the first electrode of the eighth transistor T8, so that the same reference numerals will be used and any repetitive explanation concerning the above elements will be omitted.

In the present embodiment, the pixel circuit may include a first circuit PC and a second circuit CCC. In the present embodiment, the first electrode of the eighth transistor T8 may receive the third power voltage VSS rather than the light emitting element initialization voltage VAINT of FIG. 2. Accordingly, the number of lines connected to the pixel circuit may be reduced. Accordingly, an integration of the display apparatus may be further improved.

Figure 15:
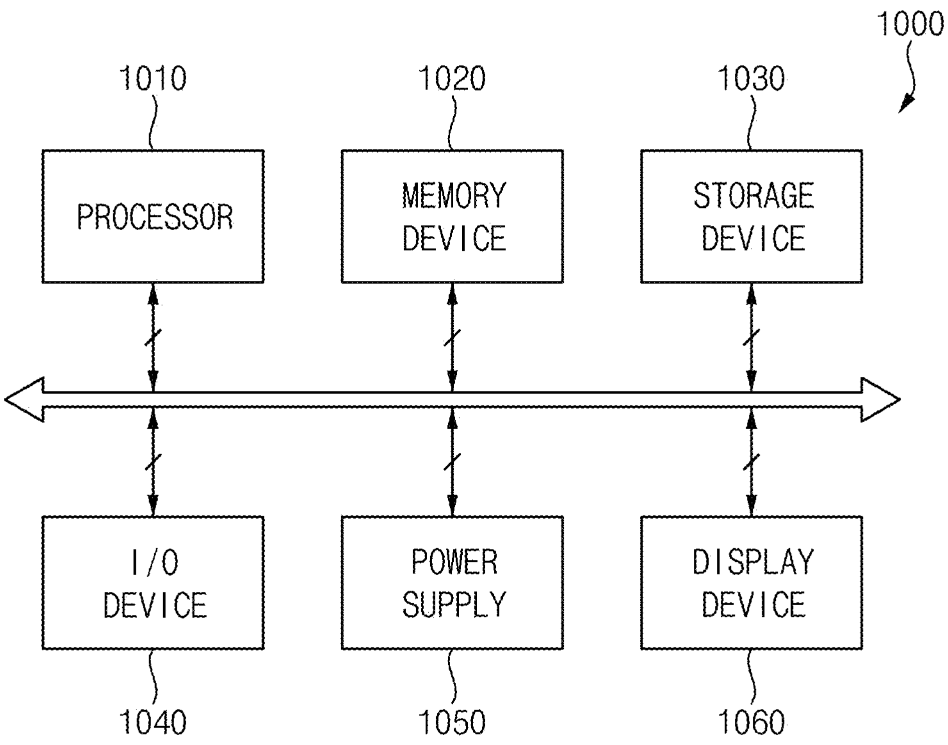
FIG. 15 is a block diagram illustrating an electronic device according to one or more embodiments of the present disclosure.
Figure 16:
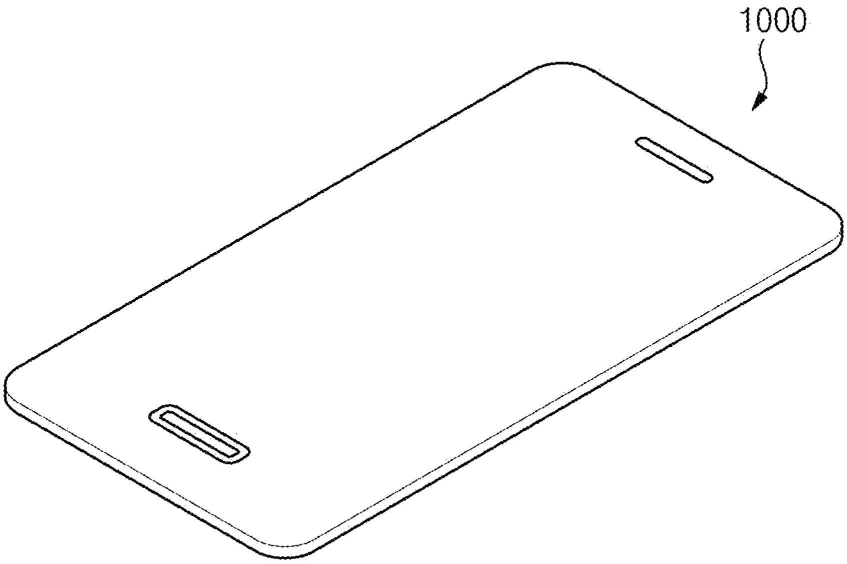
FIG. 16 is a diagram illustrating an example in which the electronic device of FIG. 15 is implemented as a smart phone.

FIG. 15 is a block diagram illustrating an electronic device 1000 according to one or more embodiments of the present disclosure. FIG. 16 is a diagram illustrating an example in which the electronic device of FIG. 15 is implemented as a smart phone.

Referring to FIG. 15, the electronic device 1000 may include a processor 1010, a memory device 1020, a storage device 1030, an input/output (I/O) device 1040, a power supply 1050, and a display device 1060. Here, the display device 1060 may be the display apparatus of FIG. 1. Additionally, the electronic device 1000 may further include a plurality of ports for communicating with a video card, a sound card, a memory card, a universal serial bus (USB) device, other electronic device, etc.

In one or more embodiments, as illustrated in FIG. 16, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, a television (TV), and/or the like.

The processor 1010 may perform various computing functions or various tasks. The processor 1010 may be a micro-processor, a central processing unit (CPU), an application processor (AP), and/or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, the app-on signal APPON and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and/or the like.

The storage device 1030 may include a solid state drive (SSD) device, a hard disk drive (HDD) device, a CD-ROM device, and/or the like. The I/O device 1040 may include an input device such as a keyboard, a keypad, a mouse device, a touch-pad, a touch-screen, and the like and an output device such as a printer, a speaker, and the like. In some embodiments, the display device 1060 may be included in the I/O device 1040. The power supply 1050 may provide power for operations of the electronic device 1000. The display device 1060 may be coupled to other components via the buses or other communication links.

Referring to FIG. 16, the electronic device of the present disclosure is shown implemented as a smartphone, but the present inventive concept is not limited thereto. The electronic device may be a television, a monitor, a laptop computer, and/or a tablet. Additionally, the electronic device may be a car.

The display apparatus according to the embodiments may be applied to a display apparatus included in a computer, a notebook, a mobile phone, a smart phone, a smart pad, a PMP, a PDA, an MP3 player, and/or the like.

The foregoing is illustrative of the present disclosure and is not to be construed as limiting thereof. Although a few embodiments of the present disclosure have been described, those skilled in the art will readily appreciate that many modifications are possible in the embodiments without materially departing from the novel teachings and aspects of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims and their equivalents. The present disclosure is defined by the following claims, with equivalents of the claims to be included therein.

What is claimed is:

1. A pixel circuit comprising:

a first transistor comprising a control electrode connected to a first node, a first electrode connected to a second node, and a second electrode connected to a third node;

a second transistor configured apply a data voltage to the first transistor;

a third transistor connected to the first node and the third node;

a fourth transistor configured to apply a first power voltage to the second node in response to a first emission signal;

a fifth transistor configured to apply a voltage of a fourth node to the third node in response to a second emission signal different from the first emission signal;

a sixth transistor configured to receive the first emission signal;

a seventh transistor configured to apply a driving current to a light emitting element and connected to the fourth node, the seventh transistor comprising a control electrode connected to the fourth node, a first electrode connected to a fifth node, and a second electrode directly connected to a first terminal of the light emitting element;

an eighth transistor comprising a control electrode configured to receive an initialization signal, a first electrode configured to receive a light emitting element initialization voltage, and a second electrode connected to the first terminal of the light emitting element; and a ninth transistor configured to apply an initialization voltage to the fourth node, wherein the light emitting element is configured to emit light based on the driving current, wherein the light emitting element initialization voltage is different from the initialization voltage, wherein the initialization voltage has a low initialization voltage level or a constant current voltage level, and wherein the first transistor is a P-type transistor, the second transistor is an N-type transistor, the third transistor is an N-type transistor, and the seventh transistor is a P-type transistor.

2. The pixel circuit of claim 1, wherein the ninth transistor comprises a control electrode configured to receive a scan signal, a first electrode configured to receive the initialization voltage, and a second electrode connected to the fourth node.

3. The pixel circuit of claim 1, further comprising a first capacitor comprising a first electrode configured to receive a sweep signal and a second electrode connected to the first node.

4. The pixel circuit of claim 1, wherein the sixth transistor comprises a control electrode configured to receive the first emission signal, a first electrode configured to receive a second power voltage, and a second electrode connected to the seventh transistor.

5. The pixel circuit of claim 1, further comprising a second capacitor including a first electrode receiving a second power voltage and a second electrode connected to the fourth node.

6. The pixel circuit of claim 1, wherein the second transistor comprises a control electrode configured to receive a first scan signal, a first electrode configured to receive the data voltage, and a second electrode connected to the second node, and wherein the third transistor comprises a control electrode configured to receive the first scan signal, a first electrode connected to the first node, and a second electrode connected to the third node.

7. The pixel circuit of claim 1, further comprising a first capacitor and a second capacitor, wherein the second transistor comprises a control electrode configured to receive a first scan signal, a first electrode configured to receive the data voltage, and a second electrode connected to the second node, wherein the third transistor comprises a control electrode configured to receive the first scan signal, a first electrode connected to the first node, and a second electrode connected to the third node, wherein the fourth transistor comprises a control electrode configured to receive the first emission signal, a first electrode configured to receive the first power voltage, and a second electrode connected to the second node, wherein the fifth transistor comprises a control electrode configured to receive the second emission signal, a first electrode connected to the third node, and a second electrode connected to the fourth node, wherein the sixth transistor comprises a control electrode configured to receive the first emission signal, a first electrode configured to receive a second power voltage, and a second electrode connected to the fifth node, wherein the first electrode of the seventh transistor is configured to receive the second power voltage, wherein the second electrode of the eighth transistor is connected to a sixth node connected to the first terminal of the light emitting element, wherein the ninth transistor comprises a control electrode configured to receive a second scan signal, a first electrode configured to receive the initialization voltage, and a second electrode connected to the fourth node, wherein the first capacitor comprises a first electrode configured to receive a sweep signal, and a second electrode connected to the first node, wherein the second capacitor comprises a first electrode configured to receive the second power voltage and a second electrode connected to the fourth node, and wherein the light emitting element comprises a first electrode connected to the sixth node and a second electrode configured to receive a third power voltage.

8. The pixel circuit of claim 1, further comprising a first capacitor and a second capacitor, wherein the second transistor comprises a control electrode configured to receive a first scan signal, a first electrode configured to receive the data voltage, and a second electrode connected to the second node, wherein the third transistor comprises a control electrode configured to receive the first scan signal, a first electrode connected to the first node, and a second electrode connected to the third node, wherein the fourth transistor comprises a control electrode configured to receive the first emission signal, a first electrode configured to receive the first power voltage, and a second electrode connected to the second node, wherein the fifth transistor comprises a control electrode configured to receive the second emission signal, a first electrode connected to the third node, and a second electrode connected to the fourth node, wherein the sixth transistor comprises a control electrode configured to receive the first emission signal, a first electrode configured to receive a second power voltage, and a second electrode connected to the fifth node, wherein the second electrode of the seventh transistor is connected to a sixth node connected to the first terminal of the light emitting element, wherein the second electrode of the eighth transistor is connected to the sixth node, wherein the ninth transistor comprises a control electrode configured to receive a second scan signal, a first electrode configured to receive the initialization voltage, and a second electrode connected to the fourth node, wherein the first capacitor comprises a first electrode configured to receive a sweep signal, and a second electrode connected to the first node, wherein the second capacitor comprises a first electrode configured to receive the second power voltage and a second electrode connected to the fourth node, and wherein the light emitting element comprises a first electrode connected to the sixth node and a second electrode configured to receive a third power voltage.

9. The pixel circuit of claim 8, wherein the fourth transistor, the fifth transistor, the sixth transistor, and the eighth transistor are P-type transistors, and the ninth transistor is an N-type transistor.

10. The pixel circuit of claim 8, wherein the sixth transistor and the eighth transistor are P-type transistors, and the fourth transistor, the fifth transistor and the ninth transistor are N-type transistors.

11. The pixel circuit of claim 8, wherein the light emitting element initialization voltage is the third power voltage.

12. The pixel circuit of claim 8, wherein in a first period, the initialization voltage has the low initialization voltage level, the first scan signal has an activation level, the second scan signal has an activation level, the first emission signal has an inactivation level, the second emission signal has an activation level, and the initialization signal has an activation level, and wherein in the first period, the third transistor, the fifth transistor, the eighth transistor and the ninth transistor are turned on, and the fourth transistor is turned off.

13. The pixel circuit of claim 12, wherein in a second period following to the first period, the initialization voltage has the low initialization voltage level, the first scan signal has an inactivation level, the second scan signal has an activation level, the first emission signal has an inactivation level, and the second emission signal has an inactivation level, and wherein in the second period, the ninth transistor is turned on, and the fifth transistor is turned off.

14. The pixel circuit of claim 13, wherein in a third period following to the second period, the first scan signal has an activation level, and the second emission signal has an inactivation level, and wherein in the third period, the second transistor and the third transistor are turned on, and the fifth transistor is turned off.

15. The pixel circuit of claim 14, wherein a fourth period following to the third period, the initialization voltage has the constant current voltage level, the second scan signal has an activation level, and the second emission signal has an inactivation level, and wherein in the fourth period, the ninth transistor is turned on, and the fifth transistor is turned off.

16. The pixel circuit of claim 15, wherein a fifth period following to the fourth period, the sweep signal is gradually decreased from a high level, and the first emission signal has an activation level, and wherein in the fifth period, the sixth transistor and the seventh transistor is turned on.

17. The pixel circuit of claim 16, wherein in a sixth period following to the fifth period, the sweep signal is gradually decreased, and the second emission signal has an activation level, and wherein in the sixth period, the first transistor and the fifth transistor are turned on, and the seventh transistor is turned off.

18. The pixel circuit of claim 17, wherein in a seventh period following to the sixth period, the sweep signal has the high level, the first emission signal has an inactivation level, the second emission signal has an inactivation level, and the initialization signal has an activation level, and wherein in the seventh period, the eighth transistor is turned on.

19. A display apparatus comprising:

a display panel comprising a pixel circuit;

a gate driver configured to apply a gate signal to the pixel circuit;

an emission driver configured to apply an emission signal to the pixel circuit; and a data driver configured to apply a data voltage to the pixel circuit, wherein the pixel circuit comprises:

a first transistor comprising a control electrode connected to a first node, a first electrode connected to a second node, and a second electrode connected to a third node;

a second transistor configured apply the data voltage to the first transistor;

a third transistor connected to the first node and the third node;

a fourth transistor configured to apply a first power voltage to the second node in response to a first emission signal;

a fifth transistor configured to apply a voltage of a fourth node to the third node in response to a second emission signal different from the first emission signal;

a sixth transistor configured to receive the first emission signal;

a seventh transistor configured to apply a driving current to a light emitting element and connected to the fourth node, the seventh transistor comprising a control electrode connected to the fourth node, a first electrode connected to a fifth node, and a second electrode directly connected to a first terminal of the light emitting element;

an eighth transistor comprising a control electrode configured to receive an initialization signal, a first electrode configured to receive a light emitting element initialization voltage, and a second electrode connected to the first terminal of the light emitting element; and a ninth transistor configured to apply an initialization voltage to the fourth node, wherein the light emitting element configured to emit light based on the driving current, wherein the light emitting element initialization voltage is different from the initialization voltage, wherein the initialization voltage has a low initialization voltage level or a constant current voltage level, and wherein the first transistor is a P-type transistor, the second transistor is an N-type transistor, the third transistor is an N-type transistor, and the seventh transistor is a P-type transistor.

20. An electronic device comprising a display device, the display device comprising:

a display panel comprising a pixel circuit; and a display driver configured to drive the display panel, wherein the pixel circuit comprises:

a first transistor comprising a control electrode connected to a first node, a first electrode connected to a second node, and a second electrode connected to a third node;

a second transistor configured apply a data voltage to the first transistor;

a third transistor connected to the first node and the third node;

a fourth transistor configured to apply a first power voltage to the second node in response to a first emission signal;

a fifth transistor configured to apply a voltage of a fourth node to the third node in response to a second emission signal different from the first emission signal;

a sixth transistor configured to receive the first emission signal;

a seventh transistor configured to apply a driving current to a light emitting element and connected to the fourth node, the seventh transistor comprising a control electrode connected to the fourth node, a first electrode connected to a fifth node, and a second electrode directly connected to a first terminal of the light emitting element;

an eighth transistor comprising a control electrode configured to receive an initialization signal, a first electrode configured to receive a light emitting element initialization voltage, and a second electrode connected to the first terminal of the light emitting element; and a ninth transistor configured to apply an initialization voltage to the fourth node, wherein the light emitting element is configured to emit light based on the driving current, wherein the light emitting element initialization voltage is different from the initialization voltage, wherein the initialization voltage has a low initialization voltage level or a constant current voltage level, and wherein the first transistor is a P-type transistor, the second transistor is an N-type transistor, the third transistor is an N-type transistor, and the seventh transistor is a P-type transistor.

21. The electronic device of claim 20, wherein the electronic device comprises a cellular phone, a video phone, a smart pad, a television (TV), smart watch, a car navigation system, a computer monitor, a laptop, or a head mounted display (HMD) device.

* * * * *